US012382018B2

United States Patent
Gao et al.

(10) Patent No.: US 12,382,018 B2
(45) Date of Patent: *Aug. 5, 2025

(54) CONTEXT DESIGN FOR CODING AND DECODING SYNTAX ELEMENTS IN INTER PREDICTION MODES

(71) Applicant: TENCENT AMERICA LLC, Palo Alto, CA (US)

(72) Inventors: Han Gao, San Diego, CA (US); Xin Zhao, San Jose, CA (US); Liang Zhao, Sunnyvale, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 18/185,143

(22) Filed: Mar. 16, 2023

(65) Prior Publication Data

US 2024/0146902 A1 May 2, 2024

Related U.S. Application Data

(60) Provisional application No. 63/420,071, filed on Oct. 27, 2022, provisional application No. 63/419,689, filed on Oct. 26, 2022.

(51) Int. Cl.
*H04N 19/52* (2014.01)
*H04N 19/105* (2014.01)
*H04N 19/159* (2014.01)
*H04N 19/176* (2014.01)
*H04N 19/46* (2014.01)
*H04N 19/70* (2014.01)

(52) U.S. Cl.
CPC ......... *H04N 19/105* (2014.11); *H04N 19/159* (2014.11); *H04N 19/176* (2014.11); *H04N 19/46* (2014.11); *H04N 19/70* (2014.11)

(58) Field of Classification Search
CPC .. H04N 19/105; H04N 19/159; H04N 19/176; H04N 19/46; H04N 19/70; H04N 19/13; H04N 19/52; H04N 19/91; H04N 19/129; H04N 19/513
See application file for complete search history.

(56) References Cited

U.S. PATENT DOCUMENTS

| | | | | |
|---|---|---|---|---|
| 10,397,600 | B1 * | 8/2019 | Xu | H04N 19/52 |
| 10,602,180 | B2 * | 3/2020 | Chen | H04N 19/44 |
| 10,863,193 | B2 * | 12/2020 | Chao | H04N 19/176 |
| 10,880,572 | B2 * | 12/2020 | Sugio | H04N 19/46 |

(Continued)

OTHER PUBLICATIONS

International Search Report and Written Opinion of PCT application PCT/US23/64754 dated Sep. 20, 2023, 13 pages.

*Primary Examiner* — Philip P. Dang
(74) *Attorney, Agent, or Firm* — Crowell & Moring LLP

(57) ABSTRACT

This disclosure relates generally to video coding and particularly to methods and systems for determining context for coding and decoding various syntax elements of a video stream in inter prediction modes. Various example implementations are disclosed for limiting numbers of possible coding contexts for syntax elements related to the inter prediction mode, and for selecting coding contexts for a current block based on coding information of spatially neighboring blocks and temporal motion prediction information.

20 Claims, 20 Drawing Sheets

(56) References Cited

U.S. PATENT DOCUMENTS

| | | | |
|---|---|---|---|
| 11,368,698 B2* | 6/2022 | Zhao | H04N 19/11 |
| 11,463,716 B2* | 10/2022 | Matsuba | H04N 19/157 |
| 11,516,477 B2* | 11/2022 | Garg | H04N 19/426 |
| 11,595,665 B2* | 2/2023 | Aggarwal | H04N 19/105 |
| 12,063,367 B2* | 8/2024 | Patil | H04N 19/46 |
| 12,081,767 B2* | 9/2024 | Liu | H04N 19/139 |
| 2016/0105676 A1 | 4/2016 | Pu et al. | |
| 2020/0252648 A1* | 8/2020 | Takahashi | H04N 19/56 |
| 2020/0260077 A1 | 8/2020 | Hinz et al. | |
| 2021/0058628 A1 | 2/2021 | Lee | |
| 2021/0136407 A1* | 5/2021 | Aono | H04N 19/55 |
| 2021/0195197 A1 | 6/2021 | Kato et al. | |
| 2022/0150489 A1 | 5/2022 | Zhao et al. | |
| 2022/0150529 A1* | 5/2022 | Lim | H04N 19/184 |
| 2022/0360814 A1* | 11/2022 | Wu | H04N 19/124 |

* cited by examiner

CONTEXT DESIGN FOR CODING AND DECODING SYNTAX ELEMENTS IN INTER PREDICTION MODES

INCORPORATION BY REFERENCE

This application is based on and claims the benefit of priority to U.S. Provisional Patent Application No. 63/419,689, filed on Oct. 26, 2022 and U.S. Provisional Patent Application No. 63/420,071, filed on Oct. 27, 2022, both entitled "Inter Mode Context Simplification," which are herein incorporated by reference in their entireties.

TECHNICAL FIELD

This disclosure relates generally to video coding and particularly to methods and systems for determining context for coding and decoding various syntax elements of a video stream in inter prediction modes.

BACKGROUND

This background description provided herein is for the purpose of generally presenting the context of this disclosure. Work of the presently named inventors, to the extent the work is described in this background section, as well as aspects of the description that may not otherwise qualify as prior art at the time of filing of this application, are neither expressly nor impliedly admitted as prior art against the present disclosure.

Video coding and decoding can be performed using inter-picture prediction with motion compensation. Uncompressed digital video can include a series of pictures, with each picture having a spatial dimension of, for example, 1920×1080 luminance samples and associated full or sub-sampled chrominance samples. The series of pictures can have a fixed or variable picture rate (alternatively referred to as frame rate) of, for example, 60 pictures per second or 60 frames per second. Uncompressed video has specific bitrate requirements for streaming or data processing. For example, video with a pixel resolution of 1920×1080, a frame rate of 60 frames/second, and a chroma sub sampling of 4:2:0 at 8 bit per pixel per color channel requires close to 1.5 Gbit/s bandwidth. An hour of such video requires more than 600 GBytes of storage space.

One purpose of video coding and decoding can be the reduction of redundancy in the uncompressed input video signal, through compression. Compression can help reduce the aforementioned bandwidth and/or storage space requirements, in some cases, by two orders of magnitude or more. Both lossless compression and lossy compression, as well as a combination thereof can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application albeit some information loss. In the case of video, lossy compression is widely employed in many applications. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

A video encoder and decoder can utilize techniques from several broad categories and steps, including, for example, motion compensation, Fourier transform, quantization, and entropy coding.

Video codec technologies can include techniques known as intra coding. In intra coding, sample values are represented without reference to samples or other data from previously reconstructed reference pictures. In some video codecs, a picture is spatially subdivided into blocks of samples. When all blocks of samples are coded in intra mode, that picture can be referred to as an intra picture. Intra pictures and their derivatives such as independent decoder refresh pictures, can be used to reset the decoder state and can, therefore, be used as the first picture in a coded video bitstream and a video session, or as a still image. The samples of a block after intra prediction can then be subject to a transform into frequency domain, and the transform coefficients so generated can be quantized before entropy coding. Intra prediction represents a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as that known from, for example, MPEG-2 generation coding technologies, does not use intra prediction. However, some newer video compression technologies include techniques that attempt coding/decoding of blocks based on, for example, surrounding sample data and/or metadata that are obtained during the encoding and/or decoding of spatially neighboring, and that precede in decoding order the blocks of data being intra coded or decoded. Such techniques are henceforth called "intra prediction" techniques. Note that in at least some cases, intra prediction uses reference data only from the current picture under reconstruction and not from other reference pictures.

There can be many different forms of intra prediction. When more than one of such techniques are available in a given video coding technology, the technique in use can be referred to as an intra prediction mode. One or more intra prediction modes may be provided in a particular codec. In certain cases, modes can have submodes and/or may be associated with various parameters, and mode/submode information and intra coding parameters for blocks of video can be coded individually or collectively included in mode codewords. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). Generally, for intra prediction, a predictor block can be formed using neighboring sample values that have become available. For example, available values of particular set of neighboring samples along certain direction and/or lines may be copied into the predictor block. A reference to the direction in use can be coded in the bitstream or may itself be predicted.

Referring to FIG. 1A, depicted in the lower right is a subset of nine predictor directions specified in H.265's 33 possible intra predictor directions (corresponding to the 33 angular modes of the 35 intra modes specified in H.265). The point where the arrows converge (101) represents the sample being predicted. The arrows represent the direction from which neighboring samples are used to predict the sample at 101. For example, arrow (102) indicates that sample (101) is predicted from a neighboring sample or samples to the upper right, at a 45-degree angle from the horizontal direction. Similarly, arrow (103) indicates that sample (101) is predicted from a neighboring sample or samples to the lower left of sample (101), in a 22.5-degree angle from the horizontal direction.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are example reference samples that follow a similar numbering scheme. A reference sample is labelled with an R, its Y position (e.g., row index) and X position (column index) relative to block (104). In both H.264 and H.265, prediction samples adjacently neighboring the block under reconstruction are used.

Intra picture prediction of block 104 may begin by copying reference sample values from the neighboring samples according to a signaled prediction direction. For example, assuming that the coded video bitstream includes signaling that, for this block 104, indicates a prediction direction of arrow (102)—that is, samples are predicted from a prediction sample or samples to the upper right, at a 45-degree angle from the horizontal direction. In such a case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has continued to develop. In H.264 (year 2003), for example, nine different direction are available for intra prediction. That increased to 33 in H.265 (year 2013), and JEM/VVC/BMS, at the time of this disclosure, can support up to 65 directions. Experimental studies have been conducted to help identify the most suitable intra prediction directions, and certain techniques in the entropy coding may be used to encode those most suitable directions in a small number of bits, accepting a certain bit penalty for directions. Further, the directions themselves can sometimes be predicted from neighboring directions used in the intra prediction of the neighboring blocks that have been decoded.

FIG. 1B shows a schematic (180) that depicts 65 intra prediction directions according to JEM to illustrate the increasing number of prediction directions in various encoding technologies developed over time.

The manner for mapping of bits representing intra prediction directions to the prediction directions in the coded video bitstream may vary from video coding technology to video coding technology; and can range, for example, from simple direct mappings of prediction direction to intra prediction mode, to codewords, to complex adaptive schemes involving most probable modes, and similar techniques. In all cases, however, there can be certain directions for intro prediction that are statistically less likely to occur in video content than certain other directions. As the goal of video compression is the reduction of redundancy, those less likely directions will, in a well-designed video coding technology, may be represented by a larger number of bits than more likely directions.

Inter picture prediction, or inter prediction may be based on motion compensation. In motion compensation, sample data from a previously reconstructed picture or part thereof (reference picture), after being spatially shifted in a direction indicated by a motion vector (MV henceforth), may be used for a prediction of a newly reconstructed picture or picture part (e.g., a block). In some cases, the reference picture can be the same as the picture currently under reconstruction. MVs may have two dimensions X and Y, or three dimensions, with the third dimension being an indication of the reference picture in use (akin to a time dimension).

In some video compression techniques, a current MV applicable to a certain area of sample data can be predicted from other MVs, for example from those other MVs that are related to other areas of the sample data that are spatially adjacent to the area under reconstruction and precede the current MV in decoding order. Doing so can substantially reduce the overall amount of data required for coding the MVs by relying on removing redundancy in correlated MVs, thereby increasing compression efficiency. MV prediction can work effectively, for example, because when coding an input video signal derived from a camera (known as natural video) there is a statistical likelihood that areas larger than the area to which a single MV is applicable move in a similar direction in the video sequence and, therefore, can in some cases be predicted using a similar motion vector derived from MVs of neighboring area. That results in the actual MV for a given area to be similar or identical to the MV predicted from the surrounding MVs. Such an MV in turn may be represented, after entropy coding, in a smaller number of bits than what would be used if the MV is coded directly rather than predicted from the neighboring MV(s). In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 specifies, described below is a technique henceforth referred to as "spatial merge".

Specifically, referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block uses.

SUMMARY

This disclosure relates generally to video coding and particularly to methods and systems for determining context for coding and decoding various syntax elements of a video stream in inter prediction modes In an example implementation, a method for decoding a current prediction block within a current coding block of a video stream is disclosed. The method may include receiving a flag indicating that the current prediction block is subject to an inter prediction; deriving a first parameter for quantifying an extent to which the current prediction block shares reference frames with spatially neighboring prediction blocks of the current coding block; deriving a second parameter associated with utilization of motion vector prediction in the spatially neighboring prediction blocks of the current coding block; and selecting coding contexts for at least one of a set of syntaxes associated with the inter prediction of the current prediction block according to the first parameter and the second parameter, wherein selecting the coding context is either independent of or further based on a derived value of any temporal motion vector prediction (TMVP) candidate blocks, the set of syntaxes comprising at least dynamic motion vector reference list (DRL) index and single reference inter prediction mode indicator.

In the example implementation above, the first parameter, denoted by "nearest_match," may include a predetermined aggregation of a binary row reference frame matching indicator indicating whether there is a match in reference frame between the current prediction block and at least one spatially neighboring prediction block in a row of prediction blocks immediately above the current coding block and a binary column reference frame matching indicator indicating whether there is a match in reference frame between the current prediction block and at least one spatially neighboring prediction block in a column of prediction blocks immediately left of the current coding; and the second parameter, denoted by "newmv_count," indicates a number of prediction blocks among the spatially neighboring prediction blocks of the current predication block having at least one motion vector that is predicted by at least one reference motion vector.

In any one of the example implementations above, the method may further include deriving a first context indicator, denoted by "newmv_ctx," from the first parameter and the second parameter as newmv_ctx=nearest_match+(newmv_count>0), the ( ) operator being configured to generate 1 and 0 when a logic expression enclosed therein is true and false, respectively; and selecting a set of coding contexts for the DRL index of the current prediction block according to the first parameter and the second parameter via at least newmv_ctx. Further, the selection of the set of coding contexts for the DRL index the current prediction block according to the first parameter and the second parameter is via at most newmv_ctx. The method may further include deriving a second context indicator, denoted by "refmv_ctx," from the first parameter and the second parameter as refmv_ctx=nearest_match+(newmv_count<A), A being a predefined or signaled positive integer; and in response to determining that the inter prediction of the current prediction block is in a single reference inter prediction mode, selecting a coding context for the single reference inter prediction mode of the current prediction block according to the first parameter and the second parameter via at most newmv_ctx and refmv_ctx.

In any one of the example implementations above, the method may further include deriving a second context indicator, denoted by "refmv_ctx," from the first parameter and the second parameter as refmv_ctx=nearest_match+Boolean (newmv_count<A), A being a predefined or signaled positive integer; and in response to determining that the inter prediction of the current prediction block is in a compound reference inter prediction mode, selecting a coding context for the compound reference inter prediction mode of the current prediction block according to the first parameter and the second parameter via at most newmv_ctx and refmv_ctx.

In any one of the example implementations above, the method may further include: in response to determining that the inter prediction of the current prediction block is in a single reference inter prediction mode, selecting a coding context for the single reference inter prediction mode of the current prediction block according to the first parameter and the second parameter via at most newmv_ctx.

In any one of the example implementations above, the method may further include: in response to determining that the inter prediction of the current prediction block is in a compound reference inter prediction mode, selecting a coding context for the compound reference inter prediction mode for the current prediction block according to the first parameter and the second parameter via at most newmv_ctx.

In any one of the example implementations above, the method may further include: in response to determining that an optical flow mode is used for the current prediction block, selecting a coding context for the optical flow mode of the current prediction block according to the first parameter and the second parameter via at most newmv_ctx.

In any one of the example implementations above, the derivation of the first parameter and the second parameter involves scanning M number of nearest left column and nearest above row of spatially neighboring prediction blocks of the current coding block in a predefined scanning order, M being a predefined or signaled positive integer. For example, M may be 2. For another example, M may be 4.

In any one of the example implementations above, the method may further include the predefined scanning order of the nearest left column and the nearest above row of spatially neighboring prediction blocks follows (L−1, B)→(R, T−1)→(L−1, T)→(L, T−1)→(L−1, B−1)→(L+1, T−1)→(L−1, C_row)→(C_column, T−1), wherein L, R, T, and B, represent left column, right column, top row, bottom row block coordinates of the current coding block, respectively, and C_row and C_column represent current row and current column block coordinate positions of the current prediction block, respectively. For example, In any one of the example implementations above, the predefined scanning order of the nearest left column and the nearest above row of spatially neighboring prediction blocks follows (R, T−1)→(L−1, B)→(L, T−1)→(L−1, T) wherein L, R, T, B represent left column, right column, top row, bottom row block coordinates of the current coding block, respectively.

In any one of the example implementations above, the method may further include deriving a first context indicator, denoted by "newmv_ctx," from the first parameter and the second parameter as newmv_ctx=nearest_match+(newmv_count>0), the ( ) operator being configured to generate 1 and 0 when a logic expression enclosed therein is true and false, respectively; and deriving a second context indicator, denoted by "refmv_ctx," from the first parameter and the second parameter as refmv_ctx=nearest_match+(newmv_count<A), A being a predefined or signaled positive integer. Selecting the coding contexts for the at least one of the set of syntaxes may include selecting the contexts according to newmv_ctx and refmv_ctx. The first parameter and second parameter for deriving newmv_ctx may be obtained by scanning at most L number of neighboring prediction blocks in an immediate left column and an immediate above row of the current coding block. The first parameter and second parameter for deriving refmv_ctx may be obtained by scanning at most K number of neighboring prediction blocks in the immediate left column and the immediate above row of the current coding block. L and K may be predefined or signaled positive integers not greater than M, being a predefined or signaled positive integer.

In another example implementation, a method for processing a current prediction block within a current coding block of a video stream is disclosed. The method may include receiving a flag indicating that the current prediction block is subject to an inter prediction; deriving a context parameter based on checking availability of one or more temporal motion vector prediction (TMVP) candidate blocks and comparing a global motion vector to available TMVP candidate blocks, at least one of the one or more TMVP candidate blocks being spatially located at a position other than top-left of the current coding block; and determining a coding context for a syntax element associated with the inter prediction of the current prediction block according to the context parameter.

In the example implementation above, the one or more TMVP candidate blocks comprise a single TMVP candidate block spatially located at a bottom right or a central position of the current coding block.

In any one of the example implementations above, the one or more TMVP candidate blocks comprise a plurality of TMVP candidate blocks spatially located at a bottom-right position and a central position of the current coding block; and the plurality of TMVP candidate blocks are checked for availability and a first available TMVP candidate block is compared with the global motion vector for deriving the context parameter.

In any one of the example implementations above, the one or more TMVP candidate blocks comprise a plurality of TMVP candidate blocks spatially located at a top-left position, a bottom-right position, and a central position of the current coding block; and the plurality of TMVP candidate blocks are checked for availability and a first available TMVP candidate block is compared with the global motion vector for deriving the context parameter.

Aspects of the disclosure also provide an electronic device or apparatus including a circuitry or processor configured to carry out any of the method implementations above.

Aspects of the disclosure also provide non-transitory computer-readable mediums storing instructions which when executed by an electronic device, cause the electronic device to perform any one of the method implementations above.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Throughout the specification and claims, terms may have nuanced meanings suggested or implied in context beyond an explicitly stated meaning. The phrase "in one embodiment" or "in some embodiments" as used herein does not necessarily refer to the same embodiment and the phrase "in another embodiment" or "in other embodiments" as used herein does not necessarily refer to a different embodiment. Likewise, the phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments/implementations in whole or in part.

Figure 1A:
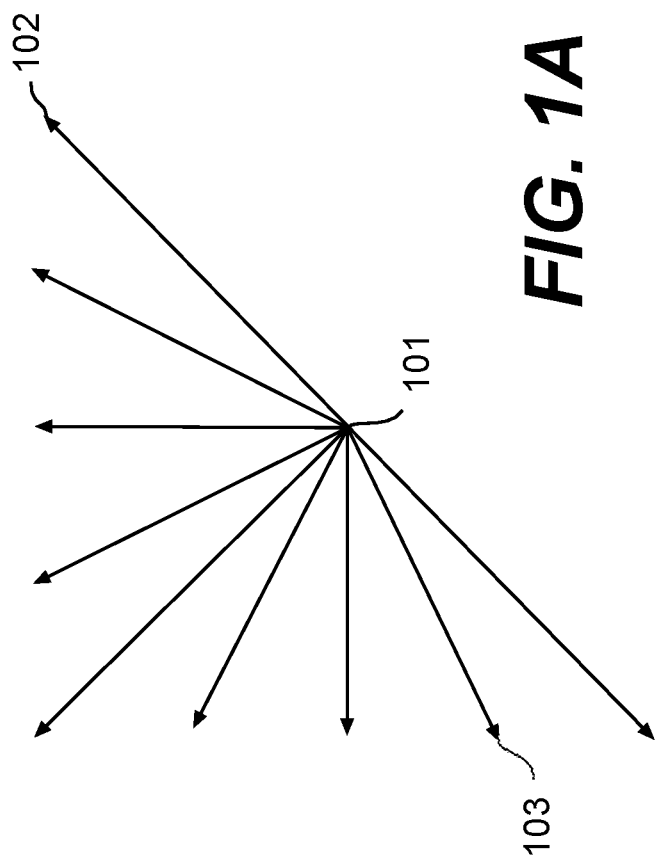
FIG. 1A shows a schematic illustration of an exemplary subset of intra prediction directional modes.
Figures 1B, 2:
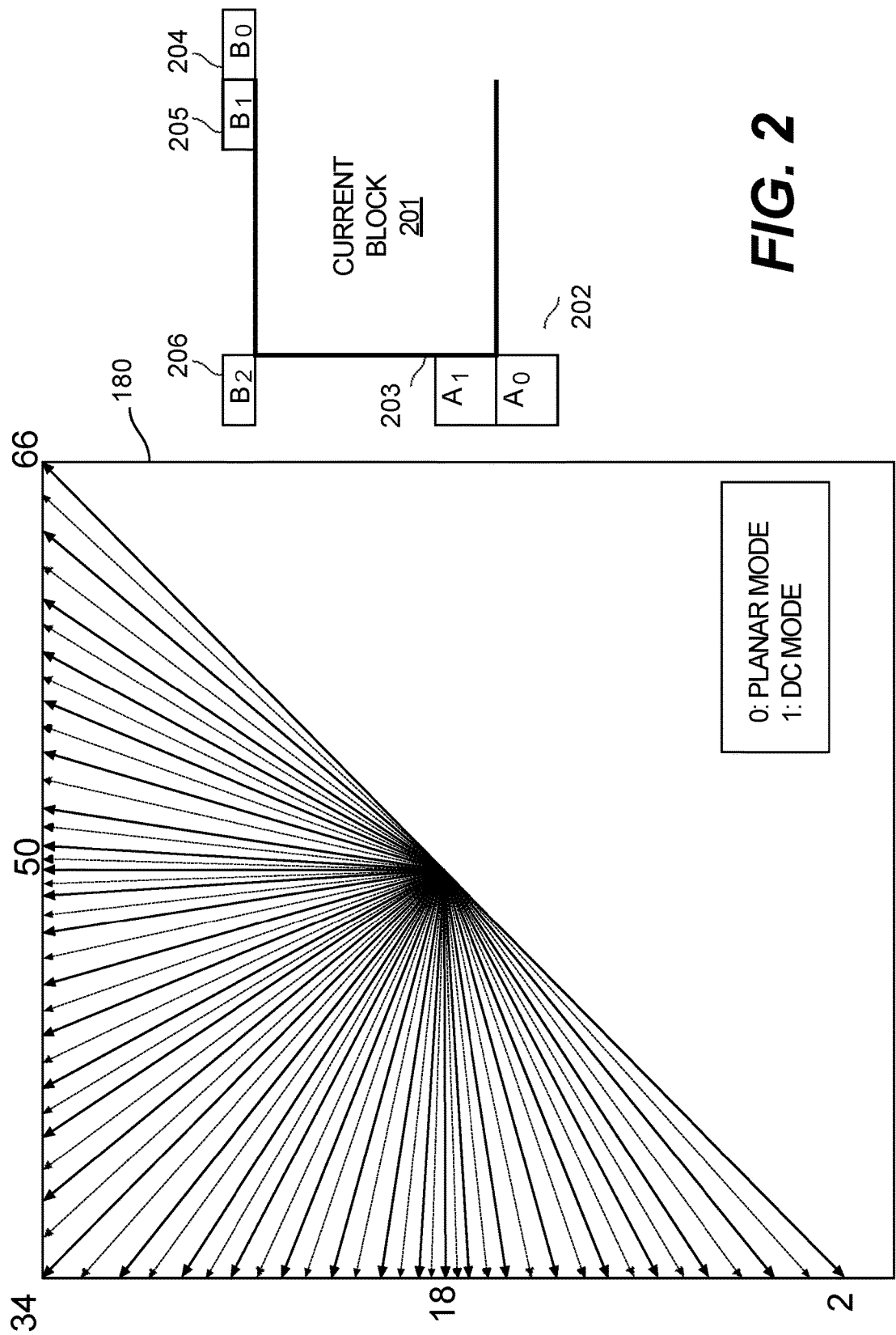
FIG. 1B shows an illustration of exemplary intra prediction directions.
FIG. 2 shows a schematic illustration of a current block and its surrounding spatial merge candidates for motion vector prediction in one example.
Figure 3:
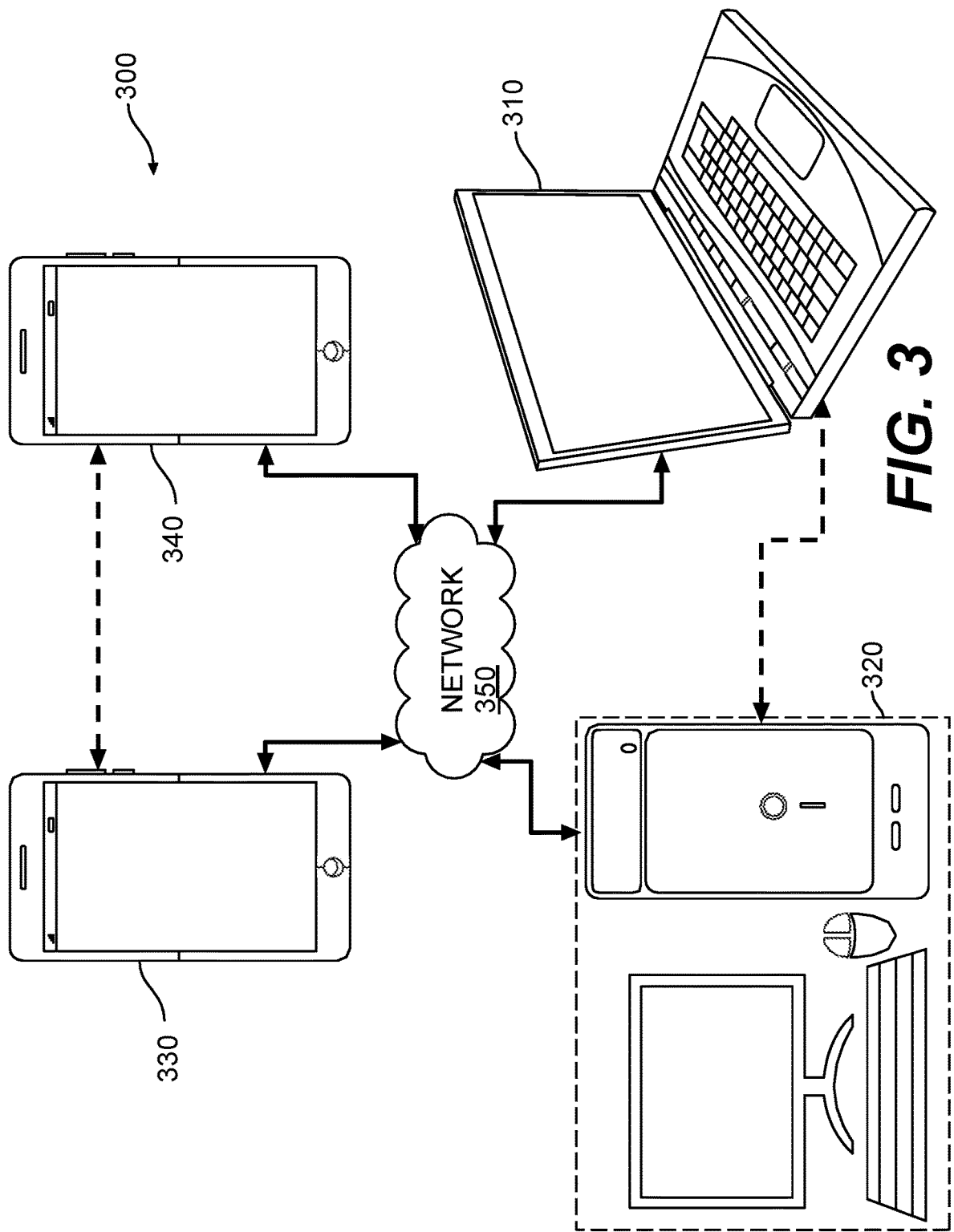
FIG. 3 shows a schematic illustration of a simplified block diagram of a communication system (300) in accordance with an example embodiment.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context. FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the example of FIG. 3, the first pair of terminal devices (310) and (320) may perform unidirectional transmission of data. For example, the terminal device (310) may code video data (e.g., of a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display the video pictures according to the recovered video data. Unidirectional data transmission may be implemented in media serving applications and the like.

In another example, the communication system (300) includes a second pair of terminal devices (330) and (340) that perform bidirectional transmission of coded video data that may be implemented, for example, during a videoconferencing application. For bidirectional transmission of data, in an example, each terminal device of the terminal devices (330) and (340) may code video data (e.g., of a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display the video pictures at an accessible display device according to the recovered video data.

In the example of FIG. 3, the terminal devices (310), (320), (330) and (340) may be implemented as servers, personal computers and smart phones but the applicability of the underlying principles of the present disclosure may not be so limited. Embodiments of the present disclosure may be implemented in desktop computers, laptop computers, tablet computers, media players, wearable computers, dedicated video conferencing equipment, and/or the like. The network (350) represents any number or types of networks that convey coded video data among the terminal devices (310), (320), (330) and (340), including for example wireline (wired) and/or wireless communication networks. The communication network (350)9 may exchange data in circuit-switched, packet-switched, and/or other types of channels. Representative networks include telecommunications networks, local area networks, wide area networks and/or the Internet. For the purposes of the present discussion, the architecture and topology of the network (350) may be immaterial to the operation of the present disclosure unless explicitly explained herein.

Figure 4:
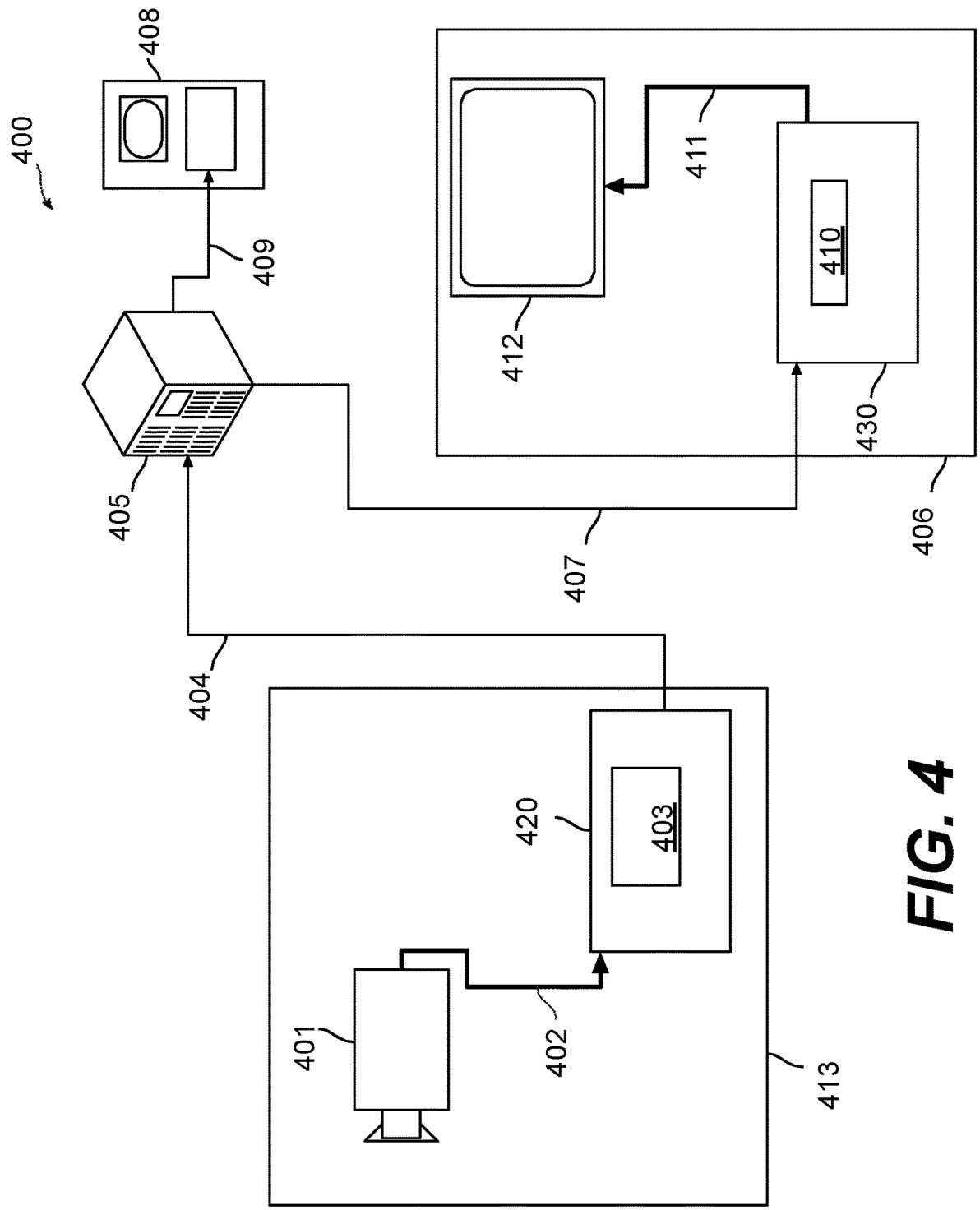
FIG. 4 shows a schematic illustration of a simplified block diagram of a communication system (400) in accordance with an example embodiment.

FIG. 4 illustrates, as an example for an application for the disclosed subject matter, a placement of a video encoder and a video decoder in a video streaming environment. The disclosed subject matter may be equally applicable to other video applications, including, for example, video conferencing, digital TV broadcasting, gaming, virtual reality, storage of compressed video on digital media including CD, DVD, memory stick and the like, and so on.

A video streaming system may include a video capture subsystem (413) that can include a video source (401), e.g., a digital camera, for creating a stream of video pictures or images (402) that are uncompressed. In an example, the stream of video pictures (402) includes samples that are recorded by a digital camera of the video source 401. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize a lower data volume when compared to the stream of uncompressed video pictures (402), can be stored on a streaming server (405) for future use or directly to downstream video devices (not shown). One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that are uncompressed and that can be rendered on a display (412) (e.g., a display screen) or other rendering devices (not depicted). The video decoder 410 may be configured to perform some or all of the various functions described in this disclosure. In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC, and other video coding standards.

It is noted that the electronic devices (420) and (430) can include other components (not shown). For example, the electronic device (420) can include a video decoder (not shown) and the electronic device (430) can include a video encoder (not shown) as well.

Figure 5:
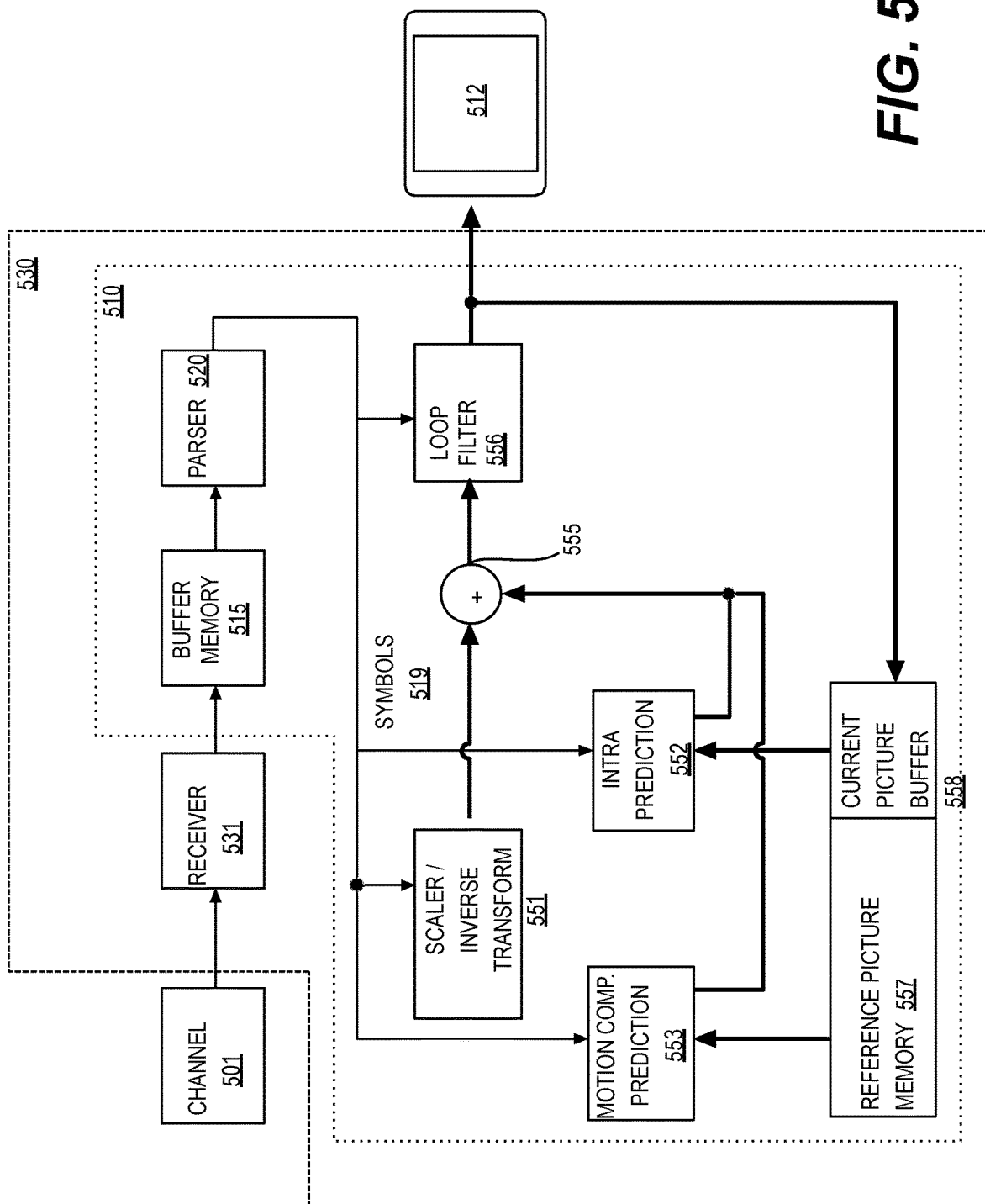
FIG. 5 shows a schematic illustration of a simplified block diagram of a video decoder in accordance with an example embodiment.

FIG. 5 shows a block diagram of a video decoder (510) according to any embodiment of the present disclosure below. The video decoder (510) can be included in an electronic device (530). The electronic device (530) can include a receiver (531) (e.g., receiving circuitry). The video decoder (510) can be used in place of the video decoder (410) in the example of FIG. 4.

The receiver (531) may receive one or more coded video sequences to be decoded by the video decoder (510). In the same or another embodiment, one coded video sequence may be decoded at a time, where the decoding of each coded video sequence is independent from other coded video sequences. Each video sequence may be associated with multiple video frames or images. The coded video sequence may be received from a channel (501), which may be a hardware/software link to a storage device which stores the encoded video data or a streaming source which transmits the encoded video data. The receiver (531) may receive the encoded video data with other data such as coded audio data and/or ancillary data streams, that may be forwarded to their respective processing circuitry (not depicted). The receiver (531) may separate the coded video sequence from the other data. To combat network jitter, a buffer memory (515) may be disposed in between the receiver (531) and an entropy decoder/parser (520) ("parser (520)" henceforth). In certain applications, the buffer memory (515) may be implemented as part of the video decoder (510). In other applications, it can be outside of and separate from the video decoder (510) (not depicted). In still other applications, there can be a buffer memory (not depicted) outside of the video decoder (510) for the purpose of, for example, combating network jitter, and there may be another additional buffer memory (515) inside the video decoder (510), for example to handle playback timing. When the receiver (531) is receiving data from a store/forward device of sufficient bandwidth and controllability, or from an isosynchronous network, the buffer memory (515) may not be needed, or can be small. For use on best-effort packet networks such as the Internet, the buffer memory (515) of sufficient size may be required, and its size can be comparatively large. Such buffer memory may be implemented with an adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as display (512) (e.g., a display screen) that may or may not an integral part of the electronic device (530) but can be coupled to the electronic device (530), as is shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received by the parser (520). The entropy coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the subgroups. The subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients (e.g., Fourier transform coefficients), quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different processing or functional units depending on the type of the coded video picture or parts thereof (such as: inter and intra picture, inter and intra block), and other factors. The units that are involved and how they are involved may be controlled by the subgroup control information that was parsed from the coded video sequence by the parser (520). The flow of such subgroup control information between the parser (520) and the multiple processing or functional units below is not depicted for simplicity.

Beyond the functional blocks already mentioned, the video decoder (510) can be conceptually subdivided into a number of functional units as described below. In a practical implementation operating under commercial constraints, many of these functional units interact closely with each other and can, at least partly, be integrated with one another. However, for the purpose of describing the various functions of the disclosed subject matter with clarity, the conceptual subdivision into the functional units is adopted in the disclosure below.

A first unit may include the scaler/inverse transform unit (551). The scaler/inverse transform unit (551) may receive a quantized transform coefficient as well as control information, including information indicating which type of inverse transform to use, block size, quantization factor/parameters, quantization scaling matrices, and the lie as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block, i.e., a block that does not use predictive information from previously reconstructed pictures, but can use predictive information from previously reconstructed parts of the current picture. Such predictive information can be provided by an intra picture prediction unit (552). In some cases, the intra picture prediction unit (552) may generate a block of the same size and shape of the block under reconstruction using surrounding block information that is already reconstructed and stored in the current picture buffer (558). The current picture buffer (558) buffers, for example, partly reconstructed current picture and/or fully reconstructed current picture. The aggregator (555), in some implementations, may add, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for inter-picture prediction. After motion compensating the fetched samples in accordance with the symbols (521) pertaining to the block, these samples can be added by the aggregator (555) to the output of the scaler/inverse transform unit (551) (output of unit 551 may be referred to as the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y components (shift), and reference picture components (time). Motion compensation may also include interpolation of sample values as fetched from the reference picture memory (557) when sub-sample exact motion vectors are in use, and may also be associated with motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values. Several type of loop filters may be included as part of the loop filter unit 556 in various orders, as will be described in further detail below.

The output of the loop filter unit (556) can be a sample stream that can be output to the rendering device (512) as well as stored in the reference picture memory (557) for use in future inter-picture prediction.

Certain coded pictures, once fully reconstructed, can be used as reference pictures for future inter-picture prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology adopted in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools from all the tools available in the video compression technology or standard as the only tools available for use under that profile. To be standard-compliant, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In some example embodiments, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
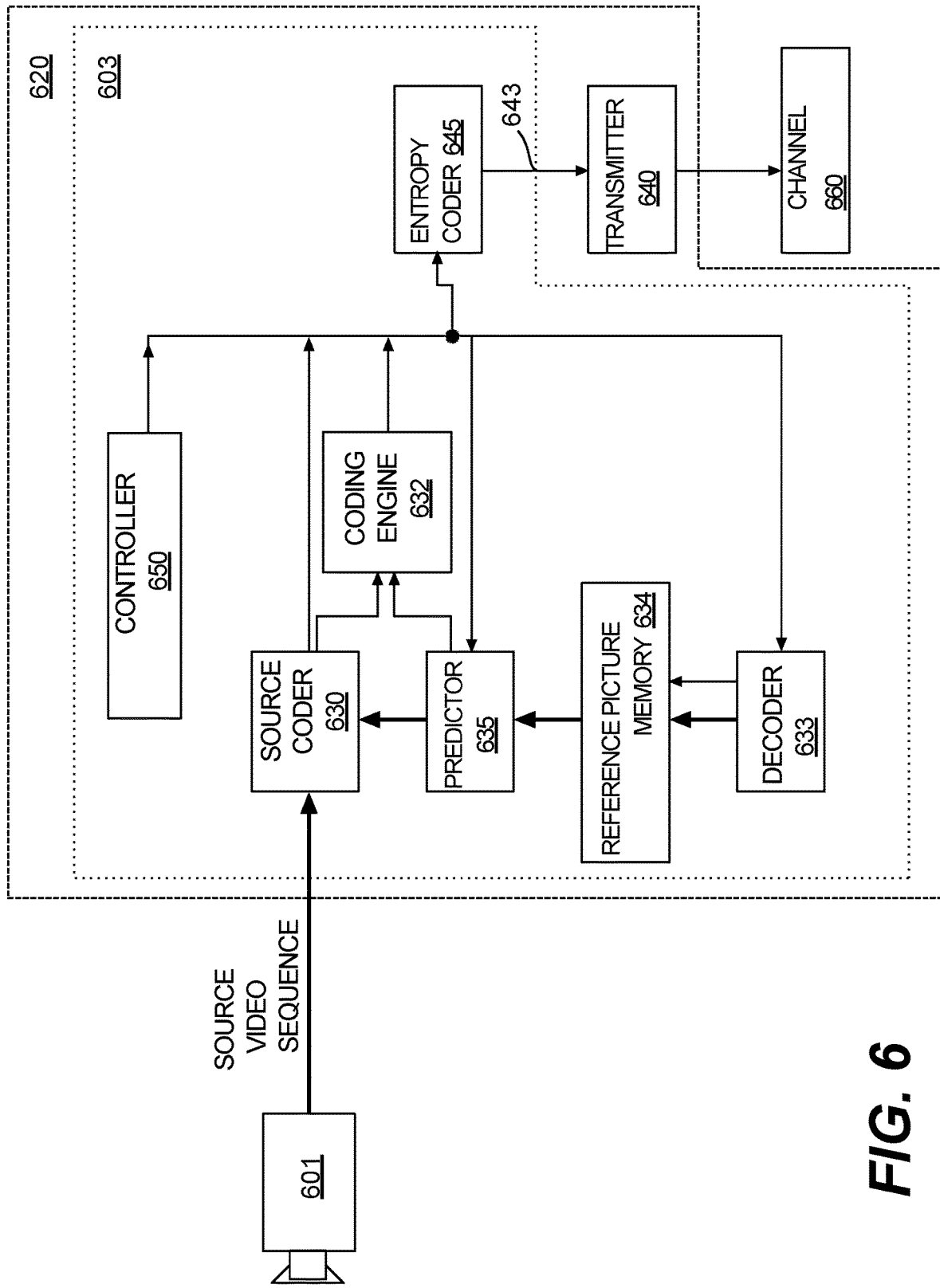
FIG. 6 shows a schematic illustration of a simplified block diagram of a video encoder in accordance with an example embodiment.

FIG. 6 shows a block diagram of a video encoder (603) according to an example embodiment of the present disclosure. The video encoder (603) may be included in an electronic device (620). The electronic device (620) may further include a transmitter (640) (e.g., transmitting circuitry). The video encoder (603) can be used in place of the video encoder (403) in the example of FIG. 4.

The video encoder (603) may receive video samples from a video source (601) (that is not part of the electronic device (620) in the example of FIG. 6) that may capture video image(s) to be coded by the video encoder (603). In another example, the video source (601) may be implemented as a portion of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 YCrCb, RGB, XYZ . . . ), and any suitable sampling structure (for example YCrCb 4:2:0, YCrCb 4:4:4). In a media serving system, the video source (601) may be a storage device capable of storing previously prepared video. In a videoconferencing system, the video source (601) may be a camera that captures local image information as a video sequence. Video data may be provided as a plurality of individual pictures or images that impart motion when viewed in sequence. The pictures themselves may be organized as a spatial array of pixels, wherein each pixel can comprise one or more samples depending on the sampling structure, color space, and the like being in use. A person having ordinary skill in the art can readily understand the relationship between pixels and samples. The description below focuses on samples.

According to some example embodiments, the video encoder (603) may code and compress the pictures of the source video sequence into a coded video sequence (643) in real time or under any other time constraints as required by the application. Enforcing appropriate coding speed constitutes one function of a controller (650). In some embodiments, the controller (650) may be functionally coupled to and control other functional units as described below. The coupling is not depicted for simplicity. Parameters set by the controller (650) can include rate control related parameters (picture skip, quantizer, lambda value of rate-distortion optimization techniques, . . . ), picture size, group of pictures (GOP) layout, maximum motion vector search range, and the like. The controller (650) can be configured to have other suitable functions that pertain to the video encoder (603) optimized for a certain system design.

In some example embodiments, the video encoder (603) may be configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder would create even though the embedded decoder 633 process coded video steam by the source coder 630 without entropy coding (as any compression between symbols and coded video bitstream in entropy coding may be lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used to improve coding quality.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633) in the encoder.

An observation that can be made at this point is that any decoder technology except the parsing/entropy decoding that may only be present in a decoder also may necessarily need to be present, in substantially identical functional form, in a corresponding encoder. For this reason, the disclosed subject matter may at times focus on decoder operation, which allies to the decoding portion of the encoder. The description of encoder technologies can thus be abbreviated as they are the inverse of the comprehensively described decoder technologies. Only in certain areas or aspects a more detail description of the encoder is provided below.

During operation in some example implementations, the source coder (630) may perform motion compensated predictive coding, which codes an input picture predictively with reference to one or more previously coded picture from the video sequence that were designated as "reference pictures." In this manner, the coding engine (632) codes differences (or residue) in the color channels between pixel blocks of an input picture and pixel blocks of reference picture(s) that may be selected as prediction reference(s) to the input picture. The term "residue" and its adjective form "residual" may be used interchangeably.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end (remote) video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compression of the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person having ordinary skill in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample coding blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures. The source pictures or the intermediate processed pictures may be subdivided into other types of blocks for other purposes. The division of coding blocks and the other types of blocks may or may not follow the same manner, as described in further detail below.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data may accordingly conform to a syntax specified by the video coding technology or standard being used.

In some example embodiments, the transmitter (640) may transmit additional data with the encoded video. The source coder (630) may include such data as part of the coded video sequence. The additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) utilizes spatial correlation in a given picture, and inter-picture prediction utilizes temporal or other correlation between the pictures. For example, a specific picture under encoding/decoding, which is referred to as a current picture, may be partitioned into blocks. A block in the current picture, when similar to a reference block in a previously coded and still buffered reference picture in the video, may be coded by a vector that is referred to as a motion vector. The motion vector points to the reference block in the reference picture, and can have a third dimension identifying the reference picture, in case multiple reference pictures are in use.

In some example embodiments, a bi-prediction technique can be used for inter-picture prediction. According to such bi-prediction technique, two reference pictures, such as a first reference picture and a second reference picture that both proceed the current picture in the video in decoding order (but may be in the past or future, respectively, in display order) are used. A block in the current picture can be coded by a first motion vector that points to a first reference block in the first reference picture, and a second motion vector that points to a second reference block in the second reference picture. The block can be jointly predicted by a combination of the first reference block and the second reference block.

Further, a merge mode technique may be used in the inter-picture prediction to improve coding efficiency.

According to some example embodiments of the disclosure, predictions, such as inter-picture predictions and intra-picture predictions are performed in the unit of blocks. For example, a picture in a sequence of video pictures is partitioned into coding tree units (CTU) for compression, the CTUs in a picture may have the same size, such as 64×64 pixels, 32×32 pixels, or 16×16 pixels. In general, a CTU may include three parallel coding tree blocks (CTBs): one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels. Each of the one or more of the 32×32 block may be further split into 4 CUs of 16×16 pixels. In some example embodiments, each CU may be analyzed during encoding to determine a prediction type for the CU among various prediction types such as an inter prediction type or an intra prediction type. The CU may be split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. The split of a CU into PU (or PBs of different color channels) may be performed in various spatial pattern. A luma or chroma PB, for example, may include a matrix of values (e.g., luma values) for samples, such as 8×8 pixels, 16×16 pixels, 8×16 pixels, 16×8 samples, and the like.

Figure 7:
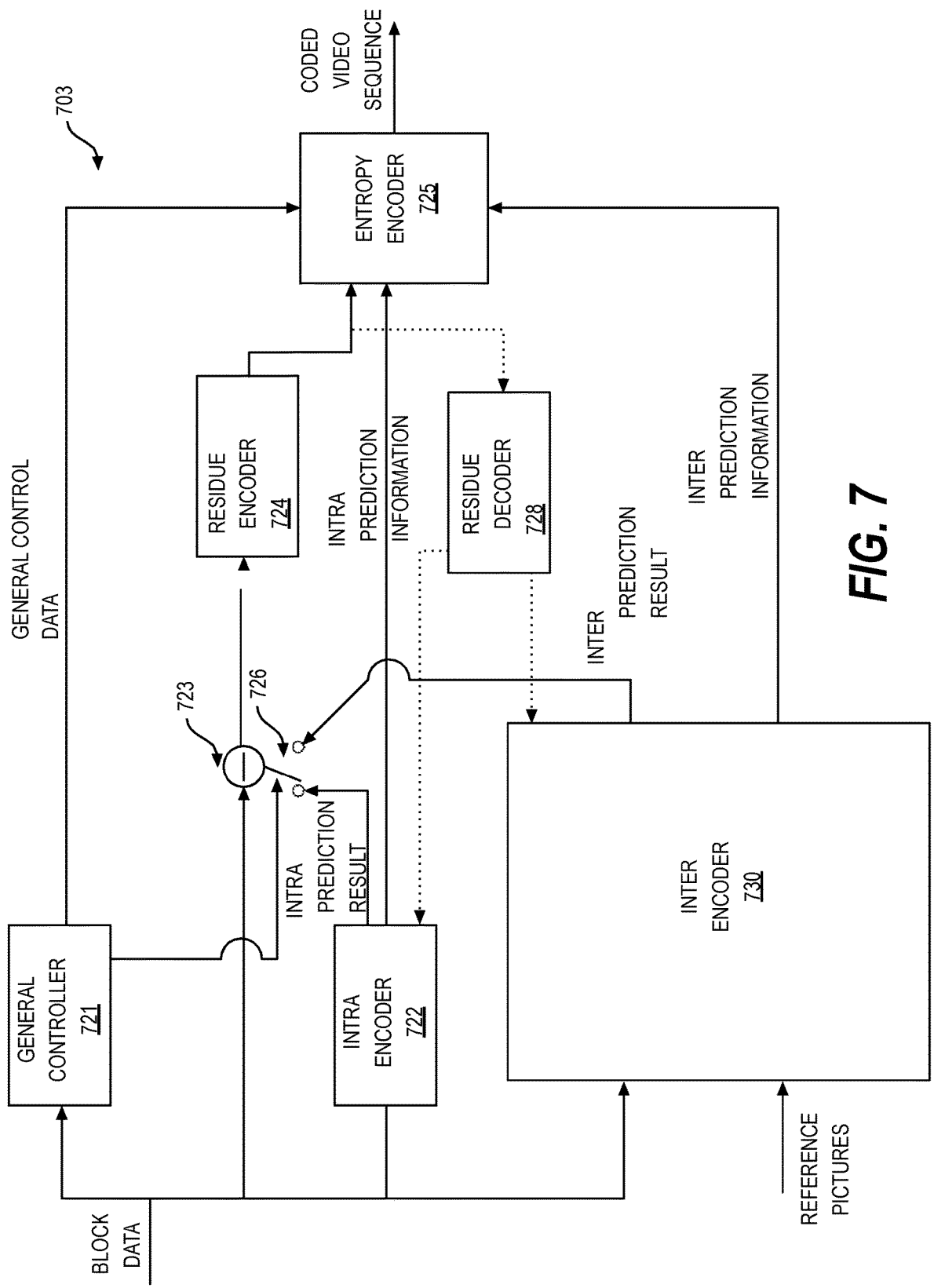
FIG. 7 shows a block diagram of a video encoder in accordance with another example embodiment.

FIG. 7 shows a diagram of a video encoder (703) according to another example embodiment of the disclosure. The video encoder (703) is configured to receive a processing block (e.g., a prediction block) of sample values within a current video picture in a sequence of video pictures, and encode the processing block into a coded picture that is part of a coded video sequence. The example video encoder (703) may be used in place of the video encoder (403) in the FIG. 4 example.

For example, the video encoder (703) receives a matrix of sample values for a processing block, such as a prediction block of 8×8 samples, and the like. The video encoder (703) then determines whether the processing block is best coded using intra mode, inter mode, or bi-prediction mode using, for example, rate-distortion optimization (RDO). When the processing block is determined to be coded in intra mode, the video encoder (703) may use an intra prediction technique to encode the processing block into the coded picture; and when the processing block is determined to be coded in inter mode or bi-prediction mode, the video encoder (703) may use an inter prediction or bi-prediction technique, respectively, to encode the processing block into the coded picture. In some example embodiments, a merge mode may be used as a submode of the inter picture prediction where the motion vector is derived from one or more motion vector predictors without the benefit of a coded motion vector component outside the predictors. In some other example embodiments, a motion vector component applicable to the subject block may be present. Accordingly, the video encoder (703) may include components not explicitly shown in FIG. 7, such as a mode decision module, to determine the perdition mode of the processing blocks.

In the example of FIG. 7, the video encoder (703) includes an inter encoder (730), an intra encoder (722), a residue calculator (723), a switch (726), a residue encoder (724), a general controller (721), and an entropy encoder (725) coupled together as shown in the example arrangement in FIG. 7.

The inter encoder (730) is configured to receive the samples of the current block (e.g., a processing block), compare the block to one or more reference blocks in reference pictures (e.g., blocks in previous pictures and later pictures in display order), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information using the decoding unit 633 embedded in the example encoder 620 of FIG. 6 (shown as residual decoder 728 of FIG. 7, as described in further detail below).

The intra encoder (722) is configured to receive the samples of the current block (e.g., a processing block), compare the block to blocks already coded in the same picture, and generate quantized coefficients after transform, and in some cases also to generate intra prediction information (e.g., an intra prediction direction information according to one or more intra encoding techniques). The intra encoder (722) may calculates intra prediction results (e.g., predicted block) based on the intra prediction information and reference blocks in the same picture.

The general controller (721) may be configured to determine general control data and control other components of the video encoder (703) based on the general control data. In an example, the general controller (721) determines the prediction mode of the block, and provides a control signal to the switch (726) based on the prediction mode. For example, when the prediction mode is the intra mode, the general controller (721) controls the switch (726) to select the intra mode result for use by the residue calculator (723), and controls the entropy encoder (725) to select the intra prediction information and include the intra prediction information in the bitstream; and when the predication mode for the block is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) may be configured to calculate a difference (residue data) between the received block and prediction results for the block selected from the intra encoder (722) or the inter encoder (730). The residue encoder (724) may be configured to encode the residue data to generate transform coefficients. For example, the residue encoder (724) may be configured to convert the residue data from a spatial domain to a frequency domain to generate the transform coefficients. The transform coefficients are then subject to quantization processing to obtain quantized transform coefficients. In various example embodiments, the video encoder (703) also includes a residual decoder (728). The residual decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures.

The entropy encoder (725) may be configured to format the bitstream to include the encoded block and perform entropy coding. The entropy encoder (725) is configured to include in the bitstream various information. For example, the entropy encoder (725) may be configured to include the general control data, the selected prediction information (e.g., intra prediction information or inter prediction information), the residue information, and other suitable information in the bitstream. When coding a block in the merge submode of either inter mode or bi-prediction mode, there may be no residue information.

Figure 8:
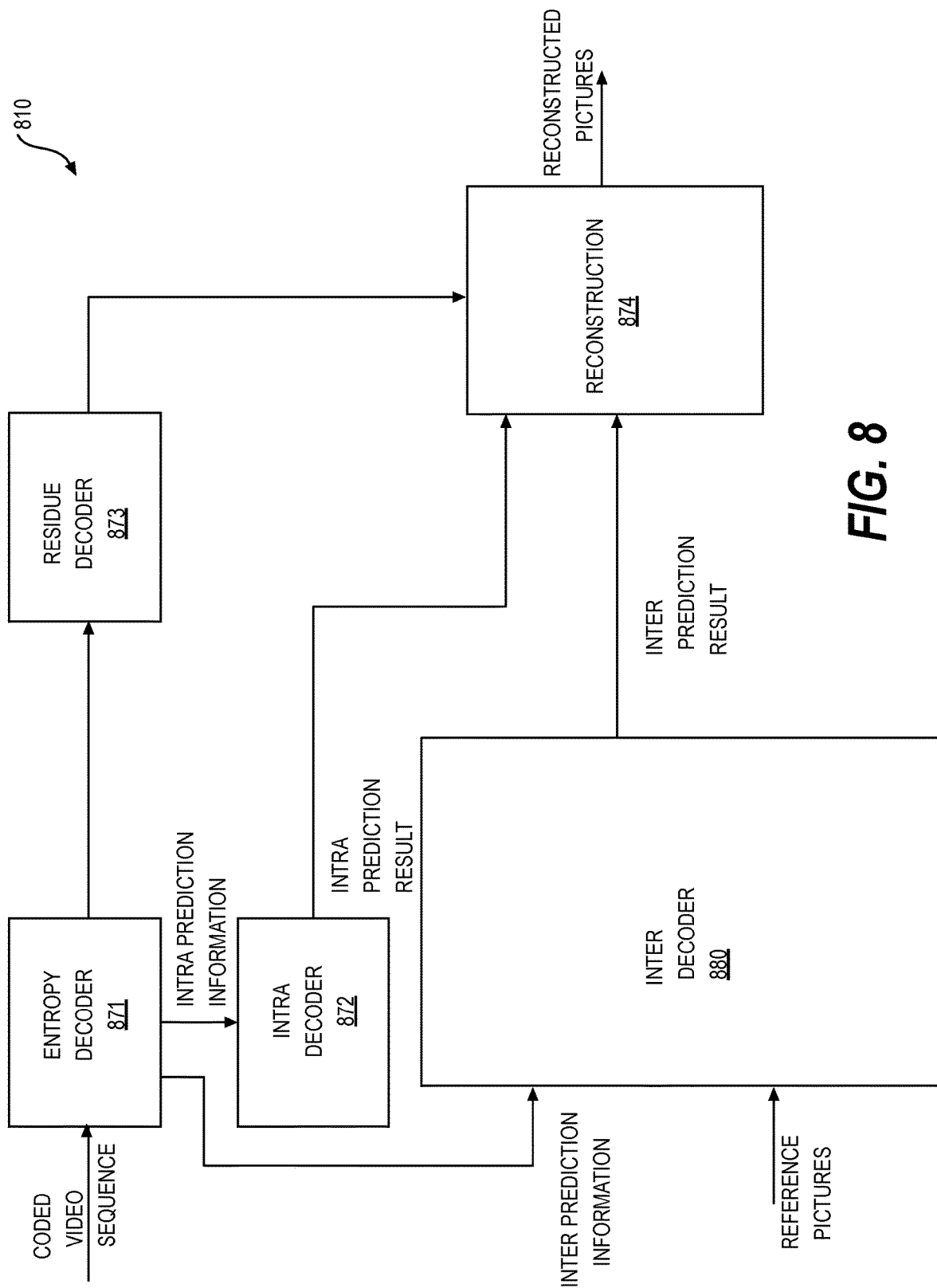
FIG. 8 shows a block diagram of a video decoder in accordance with another example embodiment.

FIG. 8 shows a diagram of an example video decoder (810) according to another embodiment of the disclosure. The video decoder (810) is configured to receive coded pictures that are part of a coded video sequence, and decode the coded pictures to generate reconstructed pictures. In an example, the video decoder (810) may be used in place of the video decoder (410) in the example of FIG. 4.

In the example of FIG. 8, the video decoder (810) includes an entropy decoder (871), an inter decoder (880), a residual decoder (873), a reconstruction module (874), and an intra decoder (872) coupled together as shown in the example arrangement of FIG. 8.

The entropy decoder (871) can be configured to reconstruct, from the coded picture, certain symbols that represent the syntax elements of which the coded picture is made up. Such symbols can include, for example, the mode in which a block is coded (e.g., intra mode, inter mode, bi-predicted mode, merge submode or another submode), prediction information (e.g., intra prediction information or inter prediction information) that can identify certain sample or metadata used for prediction by the intra decoder (872) or the inter decoder (880), residual information in the form of, for example, quantized transform coefficients, and the like. In an example, when the prediction mode is the inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residual decoder (873).

The inter decoder (880) may be configured to receive the inter prediction information, and generate inter prediction results based on the inter prediction information.

The intra decoder (872) may be configured to receive the intra prediction information, and generate prediction results based on the intra prediction information.

The residual decoder (873) may be configured to perform inverse quantization to extract de-quantized transform coefficients, and process the de-quantized transform coefficients to convert the residual from the frequency domain to the spatial domain. The residual decoder (873) may also utilize certain control information (to include the Quantizer Parameter (QP)) which may be provided by the entropy decoder (871) (data path not depicted as this may be low data volume control information only).

The reconstruction module (874) may be configured to combine, in the spatial domain, the residual as output by the residual decoder (873) and the prediction results (as output by the inter or intra prediction modules as the case may be) to form a reconstructed block forming part of the reconstructed picture as part of the reconstructed video. It is noted that other suitable operations, such as a deblocking operation and the like, may also be performed to improve the visual quality.

It is noted that the video encoders (403), (603), and (703), and the video decoders (410), (510), and (810) can be implemented using any suitable technique. In some example embodiments, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Turning to block partitioning for coding and decoding, general partitioning may start from a base block and may follow a predefined ruleset, particular patterns, partition trees, or any partition structure or scheme. The partitioning may be hierarchical and recursive. After dividing or partitioning a base block following any of the example partitioning procedures or other procedures described below, or the combination thereof, a final set of partitions or coding blocks may be obtained. Each of these partitions may be at one of various partitioning levels in the partitioning hierarchy, and may be of various shapes. Each of the partitions may be referred to as a coding block (CB). For the various example partitioning implementations described further below, each resulting CB may be of any of the allowed sizes and partitioning levels. Such partitions are referred to as coding blocks because they may form units for which some basic coding/decoding decisions may be made and coding/decoding parameters may be optimized, determined, and signaled in an encoded video bitstream. The highest or deepest level in the final partitions represents the depth of the coding block partitioning structure of tree. A coding block may be a luma coding block or a chroma coding block. The CB tree structure of each color may be referred to as coding block tree (CBT).

The coding blocks of all color channels may collectively be referred to as a coding unit (CU). The hierarchical structure of for all color channels may be collectively referred to as coding tree unit (CTU). The partitioning patterns or structures for the various color channels in in a CTU may or may not be the same.

In some implementations, partition tree schemes or structures used for the luma and chroma channels may not need to be the same. In other words, luma and chroma channels may have separate coding tree structures or patterns. Further, whether the luma and chroma channels use the same or different coding partition tree structures and the actual coding partition tree structures to be used may depend on whether the slice being coded is a P, B, or I slice. For example, For an I slice, the chroma channels and luma channel may have separate coding partition tree structures or coding partition tree structure modes, whereas for a P or B slice, the luma and chroma channels may share a same coding partition tree scheme. When separate coding partition tree structures or modes are applied, a luma channel may be partitioned into CBs by one coding partition tree structure, and a chroma channel may be partitioned into chroma CBs by another coding partition tree structure.

Figure 9:
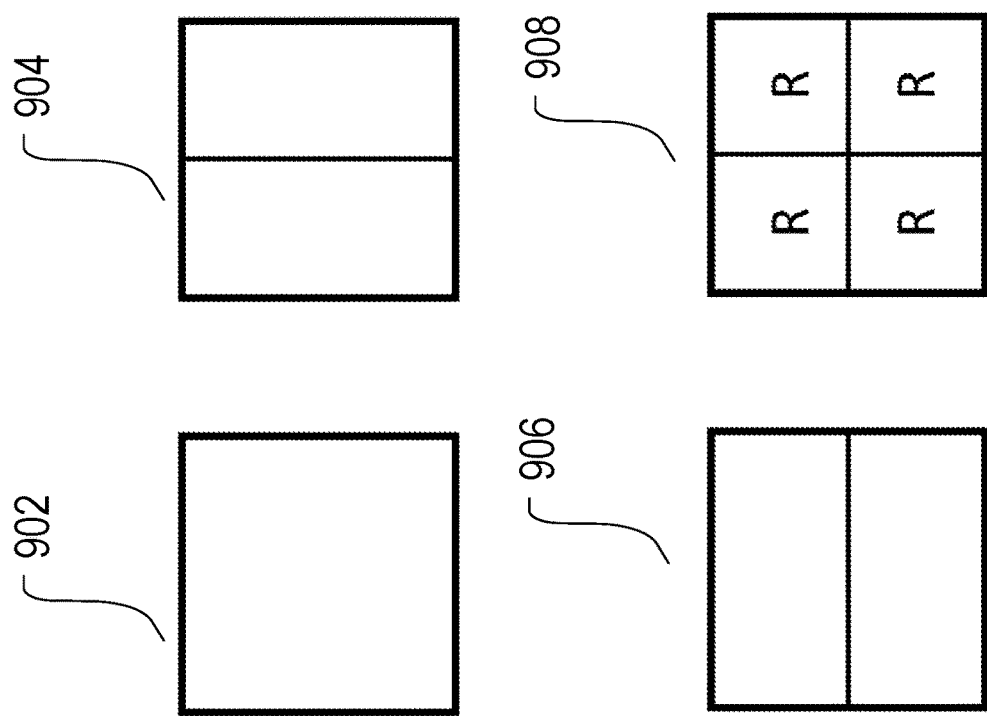
FIG. 9 shows a scheme of coding block partitioning according to example embodiments of the disclosure.

In some example implementations, a predetermined partitioning pattern may be applied to a base block. As shown in FIG. 9, an example 4-way partition tree may start from a first predefined level (e.g., 64×64 block level or other sizes, as a base block size) and a base block may be partitioned hierarchically down to a predefined lowest level (e.g., 4×4 level). For example, a base block may be subject to four predefined partitioning options or patterns indicated by 902, 904, 906, and 908, with the partitions designated as R being allowed for recursive partitioning in that the same partition options as indicated in FIG. 9 may be repeated at a lower scale until the lowest level (e.g., 4×4 level). In some implementations, additional restrictions may be applied to the partitioning scheme of FIG. 9. In the implementation of FIG. 9, rectangular partitions (e.g., 1:2/2:1 rectangular partitions) may be allowed but they may not be allowed to be recursive, whereas square partitions are allowed to be recursive. The partitioning following FIG. 9 with recursion, if needed, generates a final set of coding blocks. A coding tree depth may be further defined to indicate the splitting depth from the root node or root block. For example, the coding tree depth for the root node or root block, e.g. a 64×64 block, may be set to 0, and after the root block is further split once following FIG. 9, the coding tree depth is increased by 1. The maximum or deepest level from 64×64 base block to a minimum partition of 4×4 would be 4 (starting from level 0) for the scheme above. Such partitioning scheme may apply to one or more of the color channels. Each color channel may be partitioned independently following the scheme of FIG. 9 (e.g., partitioning pattern or option among the predefined patterns may be independently determined for each of the color channels at each hierarchical level). Alternatively, two or more of the color channels may share the same hierarchical pattern tree of FIG. 9 (e.g., the same partitioning pattern or option among the predefined patterns may be chosen for the two or more color channels at each hierarchical level).

Figure 10:
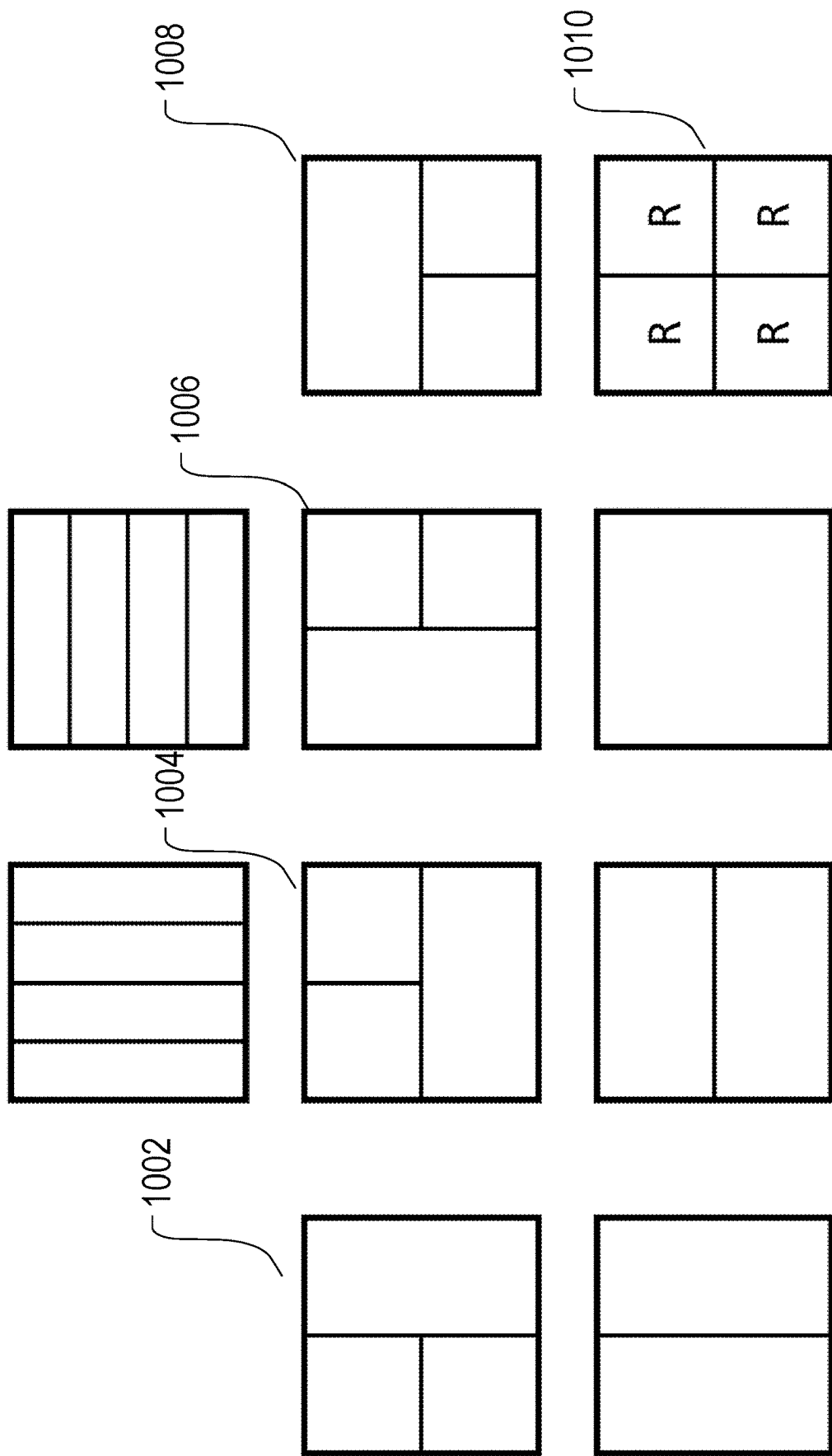
FIG. 10 shows another scheme of coding block partitioning according to example embodiments of the disclosure.

FIG. 10 shows another example predefined partitioning pattern allowing recursive partitioning to form a partitioning tree. As shown in FIG. 10, an example 10-way partitioning structure or pattern may be predefined. The root block may start at a predefined level (e.g. from a base block at 128×128 level, or 64×64 level). The example partitioning structure of FIG. 10 includes various 2:1/1:2 and 4:1/1:4 rectangular partitions. The partition types with 3 subpartitions indicated 1002, 1004, 1006, and 1008 in the second row of FIG. 10 may be referred to "T-type" partitions. The "T-Type" partitions 1002, 1004, 1006, and 1008 may be referred to as Left T-Type, Top T-Type, Right T-Type and Bottom T-Type. In some example implementations, none of the rectangular partitions of FIG. 10 is allowed to be further subdivided. A coding tree depth may be further defined to indicate the splitting depth from the root node or root block. For example, the coding tree depth for the root node or root block, e.g., a 128×128 block, may be set to 0, and after the root block is further split once following FIG. 10, the coding tree depth is increased by 1. In some implementations, only the all-square partitions in 1010 may be allowed for recursive partitioning into the next level of the partitioning tree following pattern of FIG. 10. In other words, recursive partitioning may not be allowed for the square partitions within the T-type patterns 1002, 1004, 1006, and 1008. The partitioning procedure following FIG. 10 with recursion, if needed, generates a final set of coding blocks. Such scheme may apply to one or more of the color channels. In some implementations, more flexibility may be added to the use of partitions below 8×8 level. For example, 2×2 chroma inter prediction may be used in certain cases.

In some other example implementations for coding block partitioning, a quadtree structure may be used for splitting a base block or an intermediate block into quadtree partitions. Such quadtree splitting may be applied hierarchically and recursively to any square shaped partitions. Whether a base block or an intermediate block or partition is further quadtree split may be adapted to various local characteristics of the base block or intermediate block/partition. Quadtree partitioning at picture boundaries may be further adapted. For example, implicit quadtree split may be performed at picture boundary so that a block will keep quadtree splitting until the size fits the picture boundary.

In some other example implementations, a hierarchical binary partitioning from a base block may be used. For such a scheme, the base block or an intermediate level block may be partitioned into two partitions. A binary partitioning may be either horizontal or vertical. For example, a horizontal binary partitioning may split a base block or intermediate block into equal right and left partitions. Likewise, a vertical binary partitioning may split a base block or intermediate block into equal upper and lower partitions. Such binary partitioning may be hierarchical and recursive. Decision may be made at each of the base block or intermediate block whether the binary partitioning scheme should continue, and if the scheme does continue further, whether a horizontal or vertical binary partitioning should be used. In some implementations, further partitioning may stop at a predefined lowest partition size (in either one or both dimensions). Alternatively, further partitioning may stop once a predefined partitioning level or depth from the base block is reached. In some implementations, the aspect ratio of a partition may be restricted. For example, the aspect ratio of a partition may not be smaller than 1:4 (or larger than 4:1). As such, a vertical strip partition with vertical to horizontal aspect ratio of 4:1, may only be further binary partitioned vertically into an upper and lower partitions each having a vertical to horizontal aspect ratio of 2:1.

Figure 13:
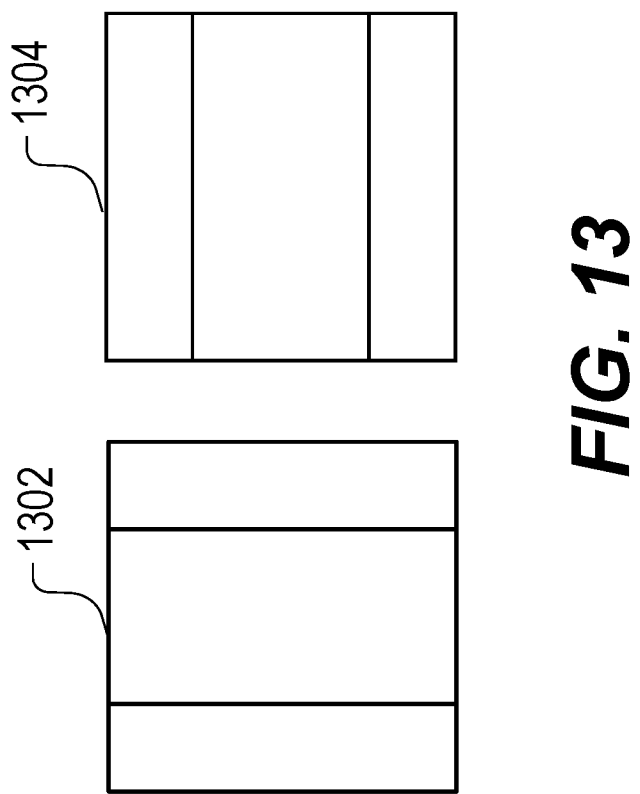
FIG. 13 shows an example ternary partitioning scheme.

In yet some other examples, a ternary partitioning scheme may be used for partitioning a base block or any intermediate block, as shown in FIG. 13. The ternary pattern may be implemented vertical, as shown in 1302 of FIG. 13, or horizontal, as shown in 1304 of FIG. 13. While the example split ratio in FIG. 13, either vertically or horizontally, is shown as 1:2:1, other ratios may be predefined. In some implementations, two or more different ratios may be predefined. Such ternary partitioning scheme may be used to complement the quadtree or binary partitioning structures in that such triple-tree partitioning is capable of capturing objects located in block center in one contiguous partition while quadtree and binary-tree are always splitting along block center and thus would split the object into separate partitions. In some implementations, the width and height of the partitions of the example triple trees are always power of 2 to avoid additional transforms.

Figure 14:
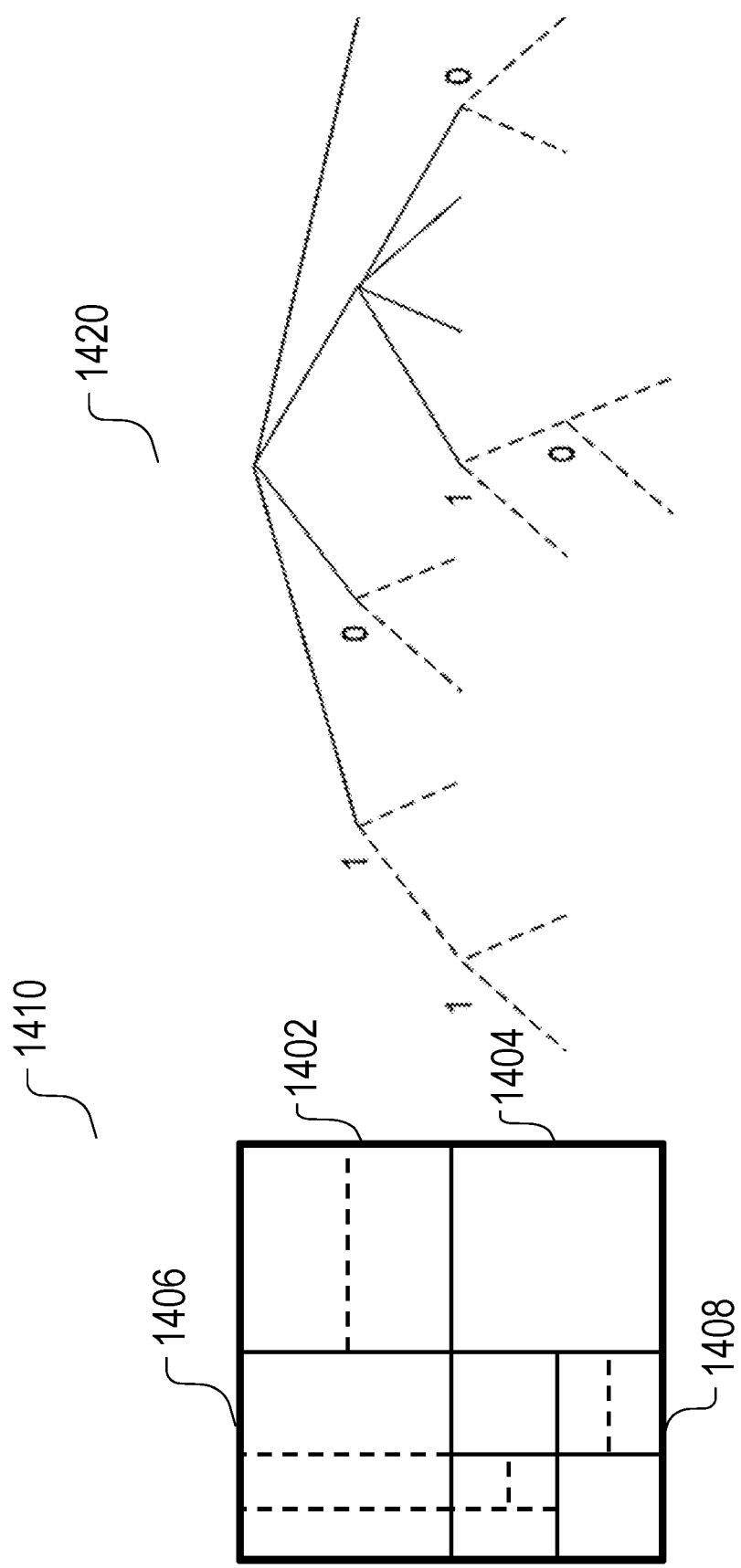
FIG. 14 shows an example quadtree binary tree coding block partitioning scheme.

The above partitioning schemes may be combined in any manner at different partitioning levels. As one example, the quadtree and the binary partitioning schemes described above may be combined to partition a base block into a quadtree-binary-tree (QTBT) structure. In such a scheme, a base block or an intermediate block/partition may be either quadtree split or binary split, subject to a set of predefined conditions, if specified. A particular example is illustrated in FIG. 14. In the example of FIG. 14, a base block is first quadtree split into four partitions, as shown by 1402, 1404, 1406, and 1408. Thereafter, each of the resulting partitions is either quadtree partitioned into four further partitions (such as 1408), or binarily split into two further partitions (either horizontally or vertically, such as 1402 or 1406, both being symmetric, for example) at the next level, or non-split (such as 1404). Binary or quadtree splitting may be allowed recursively for square shaped partitions, as shown by the overall example partition pattern of 1410 and the corresponding tree structure/representation in 1420, in which the solid lines represent quadtree splitting, and the dashed lines represent binary splitting. Flags may be used for each binary splitting node (non-leaf binary partitions) to indicate whether the binary splitting is horizontal or vertical. For example, as shown in 1420, consistent with the partitioning structure of 1410, flag "0" may represent horizontal binary splitting, and flag "1" may represent vertical binary splitting. For the quadtree-split partition, there is no need to indicate the splitting type since quadtree splitting always splits a block or a partition both horizontally and vertically to produce 4 sub-blocks/partitions with an equal size. In some implementations, flag "1" may represent horizontal binary splitting, and flag "0" may represent vertical binary splitting.

In some example implementations of the QTBT, the quadtree and binary splitting ruleset may be represented by the following predefined parameters and the corresponding functions associated therewith:
 CTU size: the root node size of a quadtree (size of a base block)
 MinQTSize: the minimum allowed quadtree leaf node size
 MaxBTSize: the maximum allowed binary tree root node size
 MaxBTDepth: the maximum allowed binary tree depth
 MinBTSize: the minimum allowed binary tree leaf node size In some example implementations of the QTBT partitioning structure, the CTU size may be set as 128×128 luma samples with two corresponding 64×64 blocks of chroma samples (when an example chroma sub-sampling is considered and used), the MinQTSize may be set as 16×16, the MaxBTSize may be set as 64×64, the MinBTSize (for both width and height) may be set as 4×4, and the MaxBTDepth may be set as 4. The quadtree partitioning may be applied to the CTU first to generate quadtree leaf nodes. The quadtree leaf nodes may have a size from its minimum allowed size of 16×16 (i.e., the MinQTSize) to 128×128 (i.e., the CTU size). If a node is 128×128, it will not be first split by the binary tree since the size exceeds the MaxBTSize (i.e., 64×64). Otherwise, nodes which do not exceed MaxBTSize could be partitioned by the binary tree. In the example of FIG. 14, the base block is 128×128. The basic block can only be quadtree split, according to the predefined ruleset. The base block has a partitioning depth of 0. Each of the resulting four partitions are 64×64, not exceeding MaxBTSize, may be further quadtree or binary-tree split at level 1. The process continues. When the binary tree depth reaches MaxBTDepth (i.e., 4), no further splitting may be considered. When the binary tree node has width equal to MinBTSize (i.e., 4), no further horizontal splitting may be considered. Similarly, when the binary tree node has height equal to MinBTSize, no further vertical splitting is considered.

In some example implementations, the QTBT scheme above may be configured to support a flexibility for the luma and chroma to have the same QTBT structure or separate QTBT structures. For example, for P and B slices, the luma and chroma CTBs in one CTU may share the same QTBT structure. However, for I slices, the luma CTBs maybe partitioned into CBs by a QTBT structure, and the chroma CTBs may be partitioned into chroma CBs by another QTBT structure. This means that a CU may be used to refer to different color channels in an I slice, e.g., the I slice may consist of a coding block of the luma component or coding blocks of two chroma components, and a CU in a P or B slice may consist of coding blocks of all three colour components.

In some other implementations, the QTBT scheme may be supplemented with ternary scheme described above. Such implementations may be referred to as multi-type-tree (MTT) structure. For example, in addition to binary splitting of a node, one of the ternary partition patterns of FIG. 13 may be chosen. In some implementations, only square nodes may be subject to ternary splitting. An additional flag may be used to indicate whether a ternary partitioning is horizontal or vertical.

The design of two-level or multi-level tree such as the QTBT implementations and QTBT implementations supplemented by ternary splitting may be mainly motivated by complexity reduction. Theoretically, the complexity of traversing a tree is $T^D$, where T denotes the number of split types, and D is the depth of tree. A tradeoff may be made by using multiple types (T) while reducing the depth (D).

In some implementations, a CB may be further partitioned. For example, a CB may be further partitioned into multiple prediction blocks (PBs) for purposes of intra or inter-frame prediction during coding and decoding processes. In other words, a CB may be further divided into different subpartitions, where individual prediction decision/configuration may be made. In parallel, a CB may be further partitioned into a plurality of transform blocks (TBs) for purposes of delineating levels at which transform or inverse transform of video data is performed. The partitioning scheme of a CB into PBs and TBs may or may not be the same. For example, each partitioning scheme may be performed using its own procedure based on, for example, the various characteristics of the video data. The PB and TB partitioning schemes may be independent in some example implementations. The PB and TB partitioning schemes and boundaries may be correlated in some other example implementations. In some implementations, for example, TBs may be partitioned after PB partitions, and in particular, each PB, after being determined following partitioning of a coding block, may then be further partitioned into one or more TBs. For example, in some implementations, a PB may be split into one, two, four, or other number of TBs.

In some implementations, for partitioning of a base block into coding blocks and further into prediction blocks and/or transform blocks, the luma channel and the chroma channels may be treated differently. For example, in some implementations, partitioning of a coding block into prediction blocks and/or transform blocks may be allowed for the luma channel, whereas such partitioning of a coding block into prediction blocks and/or transform blocks may not be allowed for the chroma channel(s). In such implementations, transform and/or prediction of luma blocks thus may be performed only at the coding block level. For another example, minimum transform block size for luma channel and chroma channel(s) may be different, e.g., coding blocks for luma channel may be allowed to be partitioned into smaller transform and/or prediction blocks than the chroma channels. For yet another example, the maximum depth of partitioning of a coding block into transform blocks and/or prediction blocks may be different between the luma channel and the chroma channels, e.g., coding blocks for luma channel may be allowed to be partitioned into deeper transform and/or prediction blocks than the chroma channel(s). For a specific example, luma coding blocks may be partitioned into transform blocks of multiple sizes that can be represented by a recursive partition going down by up to 2 levels, and transform block shapes such as square, 2:1/1:2, and 4:1/1:4 and transform block size from 4×4 to 64×64 may be allowed. For chroma blocks, however, only the largest possible transform blocks specified for the luma blocks may be allowed.

In some example implementations for partitioning of a coding block into PBs, the depth, the shape, and/or other characteristics of the PB partitioning may depend on whether the PB is intra or inter coded.

The partitioning of a coding block (or a prediction block) into transform blocks may be implemented in various example schemes, including but not limited to quadtree splitting and predefined pattern splitting, recursively or non-recursively, and with additional consideration for transform blocks at the boundary of the coding block or prediction block. In general, the resulting transform blocks may be at different split levels, may not be of the same size, and may not need to be square in shape (e.g., they can be rectangular with some allowed sizes and aspect ratios). Further examples are descried in further detail below in relation to FIGS. 15, 16 and 17.

In some other implementations, however, the CBs obtained via any of the partitioning schemes above may be used as a basic or smallest coding block for prediction and/or transform. In other words, no further splitting is performed for perform inter-prediction/intra-prediction purposes and/or for transform purposes. For example, CBs obtained from the QTBT scheme above may be directly used as the units for performing predictions. Specifically, such a QTBT structure removes the concepts of multiple partition types, i.e. it removes the separation of the CU, PU and TU, and supports more flexibility for CU/CB partition shapes as described above. In such QTBT block structure, a CU/CB can have either a square or rectangular shape. The leaf nodes of such QTBT are used as units for prediction and transform processing without any further partitioning. This means that the CU, PU and TU have the same block size in such example QTBT coding block structure.

The various CB partitioning schemes above and the further partitioning of CBs into PBs and/or TBs (including no PB/TB partitioning) may be combined in any manner. The following particular implementations are provided as non-limiting examples.

A specific example implementation of coding block and transform block partitioning is described below. In such an example implementation, a base block may be split into coding blocks using recursive quadtree splitting, or a predefined splitting pattern described above (such as those in FIG. 9 and FIG. 10). At each level, whether further quadtree splitting of a particular partition should continue may be determined by local video data characteristics. The resulting CBs may be at various quadtree splitting levels, and of various sizes. The decision on whether to code a picture area using inter-picture (temporal) or intra-picture (spatial) prediction may be made at the CB level (or CU level, for all three-color channels). Each CB may be further split into one, two, four, or other number of PBs according to predefined PB splitting type. Inside one PB, the same prediction process may be applied and the relevant information may be transmitted to the decoder on a PB basis. After obtaining the residual block by applying the prediction process based on the PB splitting type, a CB can be partitioned into TBs according to another quadtree structure similar to the coding tree for the CB. In this particular implementation, a CB or a TB may but does not have to be limited to square shape. Further in this particular example, a PB may be square or rectangular shape for an inter-prediction and may only be square for intra-prediction. A coding block may be split into, e.g., four square-shaped TBs. Each TB may be further split recursively (using quadtree split) into smaller TBs, referred to as Residual Quadtree (RQT).

Figure 11:
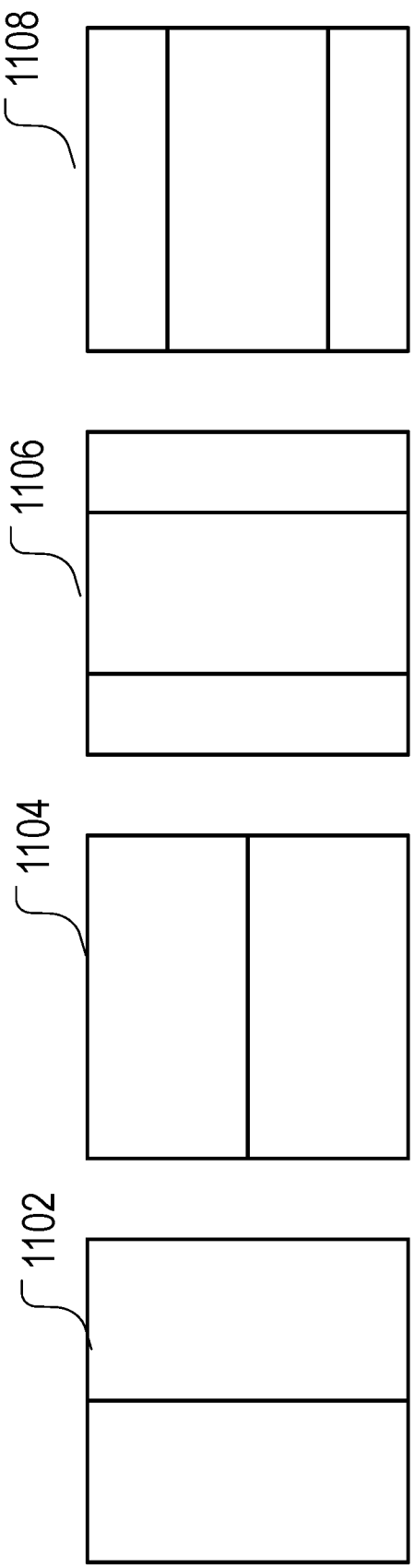
FIG. 11 shows another scheme of coding block partitioning according to example embodiments of the disclosure.

Another example implementation for partitioning of a base block into CBs, PBs and or TBs is further described below. For example, rather than using a multiple partition unit types such as those shown in FIG. 9 or FIG. 10, a quadtree with nested multi-type tree using binary and ternary splits segmentation structure (e.g., the QTBT or QTBT with ternary splitting as descried above) may be used. The separation of the CB, PB and TB (i.e., the partitioning of CB into PBs and/or TBs, and the partitioning of PBs into TBs) may be abandoned except when needed for CBs that have a size too large for the maximum transform length, where such CBs may need further splitting. This example partitioning scheme may be designed to support more flexibility for CB partition shapes so that the prediction and transform can both be performed on the CB level without further partitioning. In such a coding tree structure, a CB may have either a square or rectangular shape. Specifically, a coding tree block (CTB) may be first partitioned by a quadtree structure. Then the quadtree leaf nodes may be further partitioned by a nested multi-type tree structure. An example of the nested multi-type tree structure using binary or ternary splitting is shown in FIG. 11. Specifically, the example multi-type tree structure of FIG. 11 includes four splitting types, referred to as vertical binary splitting (SPLIT_BT_VER) (1102), horizontal binary splitting (SPLIT_BT_HOR) (1104), vertical ternary splitting (SPLIT_TT_VER) (1106), and horizontal ternary splitting (SPLIT_TT_HOR) (1108). The CBs then correspond to leaves of the multi-type tree. In this example implementation, unless the CB is too large for the maximum transform length, this segmentation is used for both prediction and transform processing without any further partitioning. This means that, in most cases, the CB, PB and TB have the same block size in the quadtree with nested multi-type tree coding block structure. The exception occurs when maximum supported transform length is smaller than the width or height of the colour component of the CB. In some implementations, in addition to the binary or ternary splitting, the nested patterns of FIG. 11 may further include quadtree splitting.

Figure 12:
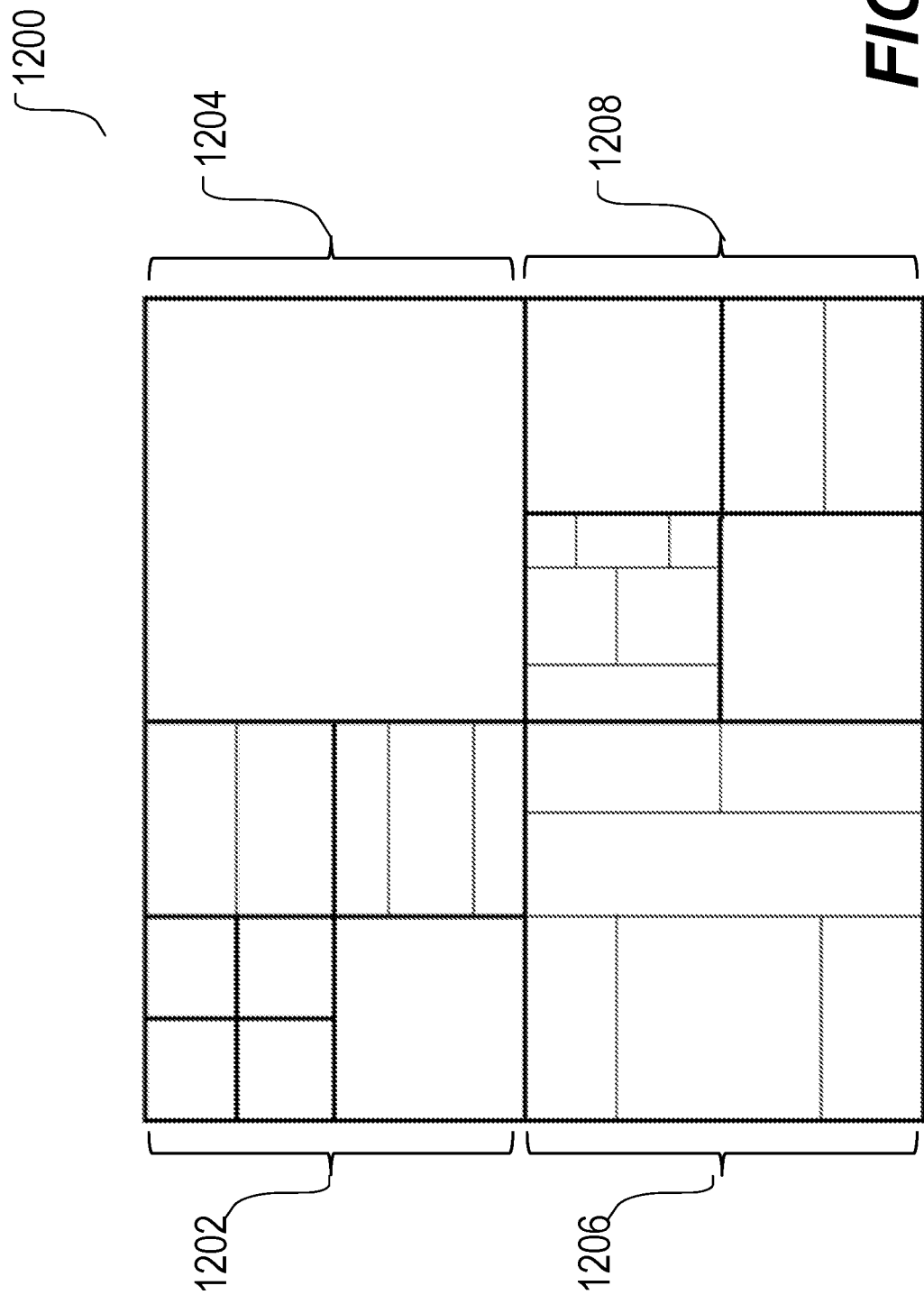
FIG. 12 shows an example partitioning of a base block into coding blocks according to an example partitioning scheme.

One specific example for the quadtree with nested multi-type tree coding block structure of block partition (including quadtree, binary, and ternary splitting options) for one base block is shown in FIG. 12. In more detail, FIG. 12 shows that the base block 1200 is quadtree split into four square partitions 1202, 1204, 1206, and 1208. Decision to further use the multi-type tree structure of FIG. 11 and quadtree for further splitting is made for each of the quadtree-split partitions. In the example of FIG. 12, partition 1204 is not further split. Partitions 1202 and 1208 each adopt another quadtree split. For partition 1202, the second level quadtree-split top-left, top-right, bottom-left, and bottom-right partitions adopts third level splitting of quadtree, horizontal binary splitting 1104 of FIG. 11, non-splitting, and horizontal ternary splitting 1108 of FIG. 11, respectively. Partition 1208 adopts another quadtree split, and the second level quadtree-split top-left, top-right, bottom-left, and bottom-right partitions adopts third level splitting of vertical ternary splitting 1106 of FIG. 11, non-splitting, non-splitting, and horizontal binary splitting 1104 of FIG. 11, respectively. Two of the subpartitions of the third-level top-left partition of 1208 are further split according to horizontal binary splitting 1104 and horizontal ternary splitting 1108 of FIG. 11, respectively. Partition 1206 adopts a second level split pattern following the vertical binary splitting 1102 of FIG. 11 into two partitions which are further split in a third-level according to horizontal ternary splitting 1108 and vertical binary splitting 1102 of the FIG. 11. A fourth level splitting is further applied to one of them according to horizontal binary splitting 1104 of FIG. 11.

For the specific example above, the maximum luma transform size may be 64×64 and the maximum supported chroma transform size could be different from the luma at, e.g., 32×32. Even though the example CBs above in FIG. 12 are generally not further split into smaller PBs and/or TBs, when the width or height of the luma coding block or chroma coding block is larger than the maximum transform width or height, the luma coding block or chroma coding block may be automatically split in the horizontal and/or vertical direction to meet the transform size restriction in that direction.

In the specific example for partitioning of a base block into CBs above, and as descried above, the coding tree scheme may support the ability for the luma and chroma to have a separate block tree structure. For example, for P and B slices, the luma and chroma CTBs in one CTU may share the same coding tree structure. For I slices, for example, the luma and chroma may have separate coding block tree structures. When separate block tree structures are applied, luma CTB may be partitioned into luma CBs by one coding tree structure, and the chroma CTBs are partitioned into chroma CBs by another coding tree structure. This means that a CU in an I slice may consist of a coding block of the luma component or coding blocks of two chroma components, and a CU in a P or B slice always consists of coding blocks of all three colour components unless the video is monochrome.

When a coding block is further partitioned into multiple transform blocks, the transform blocks therein may be order in the bitstream following various order or scanning manners. Example implementations for partitioning a coding block or prediction block into transform blocks, and a coding order of the transform blocks are described in further detail below. In some example implementations, as descried above, a transform partitioning may support transform blocks of multiple shapes, e.g., 1:1 (square), 1:2/2:1, and 1:4/4:1, with transform block sizes ranging from, e.g., 4×4 to 64×64. In some implementations, if the coding block is smaller than or equal to 64×64, the transform block partitioning may only apply to luma component, such that for chroma blocks, the transform block size is identical to the coding block size. Otherwise, if the coding block width or height is greater than 64, then both the luma and chroma coding blocks may be implicitly split into multiples of min(W, 64)×min(H, 64) and min(W, 32)×min(H, 32) transform blocks, respectively.

In some example implementations of transform block partitioning, for both intra and inter coded blocks, a coding block may be further partitioned into multiple transform blocks with a partitioning depth up to a predefined number of levels (e.g., 2 levels). The transform block partitioning depth and sizes may be related. For some example implementations, a mapping from the transform size of the current depth to the transform size of the next depth is shown in the following in Table 1.

TABLE 1

| Transform partition size setting | |
|---|---|
| Transform Size of Current Depth | Transform Size of Next Depth |
| TX_4 × 4 | TX_4 × 4 |
| TX_8 × 8 | TX_4 × 4 |
| TX_16 × 16 | TX_8 × 8 |
| TX_32 × 32 | TX_16 × 16 |
| TX_64 × 64 | TX_32 × 32 |
| TX_4 × 8 | TX_4 × 4 |
| TX_8 × 4 | TX_4 × 4 |
| TX_8 × 16 | TX_8 × 8 |
| TX_16 × 8 | TX_8 × 8 |
| TX_16 × 32 | TX_16 × 16 |
| TX_32 × 16 | TX_16 × 16 |
| TX_32 × 64 | TX_32 × 32 |
| TX_64 × 32 | TX_32 × 32 |
| TX_4 × 16 | TX_4 × 8 |
| TX_16 × 4 | TX_8 × 4 |
| TX_8 × 32 | TX_8 × 16 |
| TX_32 × 8 | TX_16 × 8 |
| TX_16 × 64 | TX_16 × 32 |
| TX_64 × 16 | TX_32 × 16 |

Based on the example mapping of Table 1, for 1:1 square block, the next level transform split may create four 1:1 square sub-transform blocks. Transform partition may stop, for example, at 4×4. As such, a transform size for a current depth of 4×4 corresponds to the same size of 4×4 for the next depth. In the example of Table 1, for 1:2/2:1 non-square block, the next level transform split may create two 1:1 square sub-transform blocks, whereas for 1:4/4:1 non-square block, the next level transform split may create two 1:2/2:1 sub transform blocks.

Figures 15, 16:
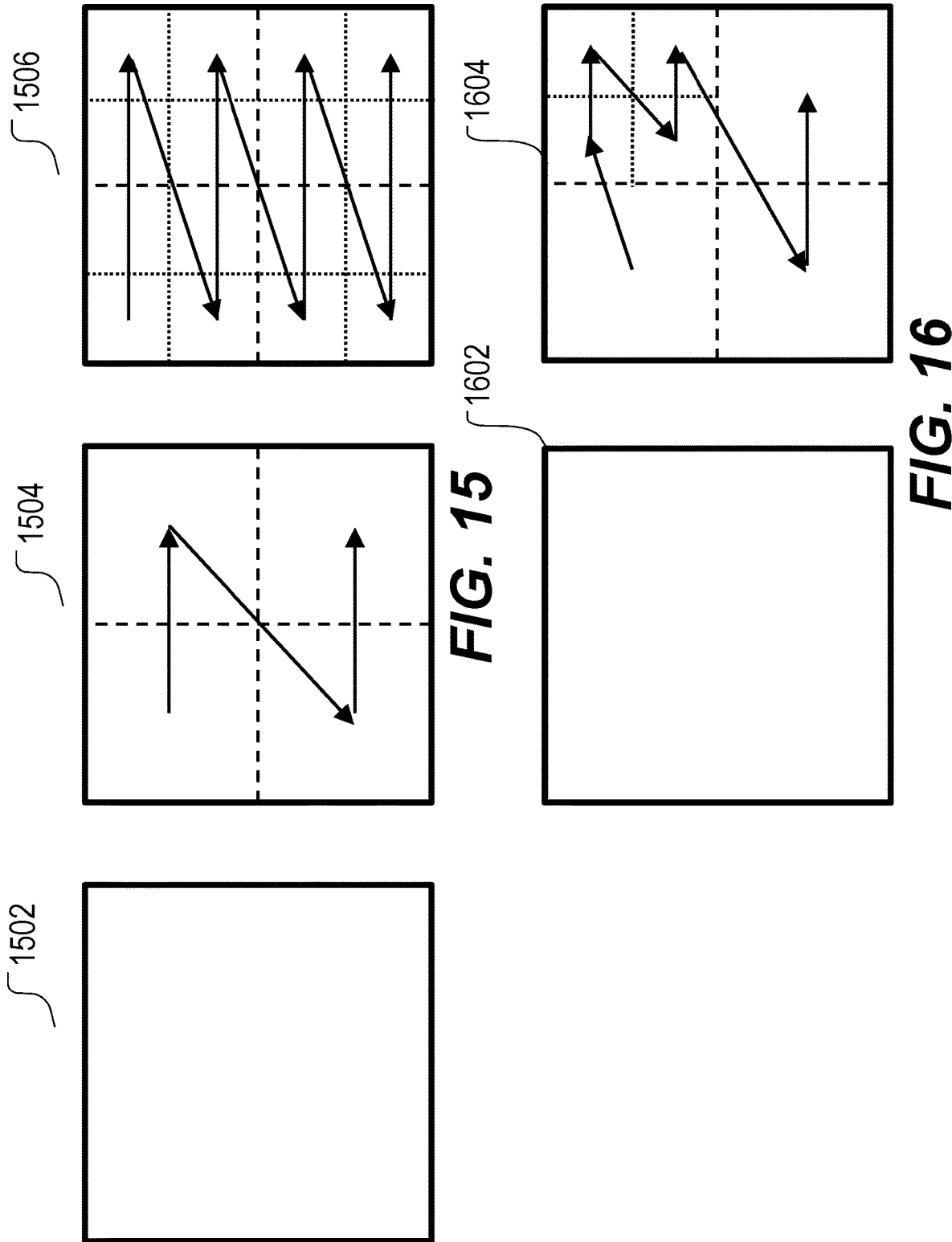
FIG. 15 shows a scheme for partitioning a coding block into multiple transform blocks and coding order of the transform blocks according to example embodiments of the disclosure.
FIG. 16 shows another scheme for partitioning a coding block into multiple transform blocks and coding order of the transform block according to example embodiments of the disclosure.

In some example implementations, for luma component of an intra coded block, additional restriction may be applied with respect to transform block partitioning. For example, for each level of transform partitioning, all the sub-transform blocks may be restricted to having equal size. For example, for a 32×16 coding block, level 1 transform split creates two 16×16 sub-transform blocks, level 2 transform split creates eight 8×8 sub-transform blocks. In other words, the second level splitting must be applied to all first level sub blocks to keep the transform units at equal sizes. An example of the transform block partitioning for intra coded square block following Table 1 is shown in FIG. 15, together with coding order illustrated by the arrows. Specifically, 1502 shows the square coding block. A first-level split into 4 equal sized transform blocks according to Table 1 is shown in 1504 with coding order indicated by the arrows. A second-level split of all of the first-level equal sized blocks into 16 equal sized transform blocks according to Table 1 is shown in 1506 with coding order indicated by the arrows.

In some example implementations, for luma component of inter coded block, the above restriction for intra coding may not be applied. For example, after the first level of transform splitting, any one of sub-transform block may be further split independently with one more level. The resulting transform blocks thus may or may not be of the same size. An example split of an inter coded block into transform locks with their coding order is show in FIG. 16. In the Example of FIG. 16, the inter coded block 1602 is split into transform blocks at two levels according to Table 1. At the first level, the inter coded block is split into four transform blocks of equal size. Then only one of the four transform blocks (not all of them) is further split into four sub-transform blocks, resulting in a total of 7 transform blocks having two different sizes, as shown by 1604. The example coding order of these 7 transform blocks is shown by the arrows in 1604 of FIG. 16.

In some example implementations, for chroma component(s), some additional restriction for transform blocks may apply. For example, for chroma component(s) the transform block size can be as large as the coding block size, but not smaller than a predefined size, e.g., 8×8.

In some other example implementations, for the coding block with either width (W) or height (H) being greater than 64, both the luma and chroma coding blocks may be implicitly split into multiples of min(W, 64)×min(H, 64) and min(W, 32)×min(H, 32) transform units, respectively. Here, in the present disclosure, a "min(a, b)" may return a smaller value between a and b.

Figure 17:
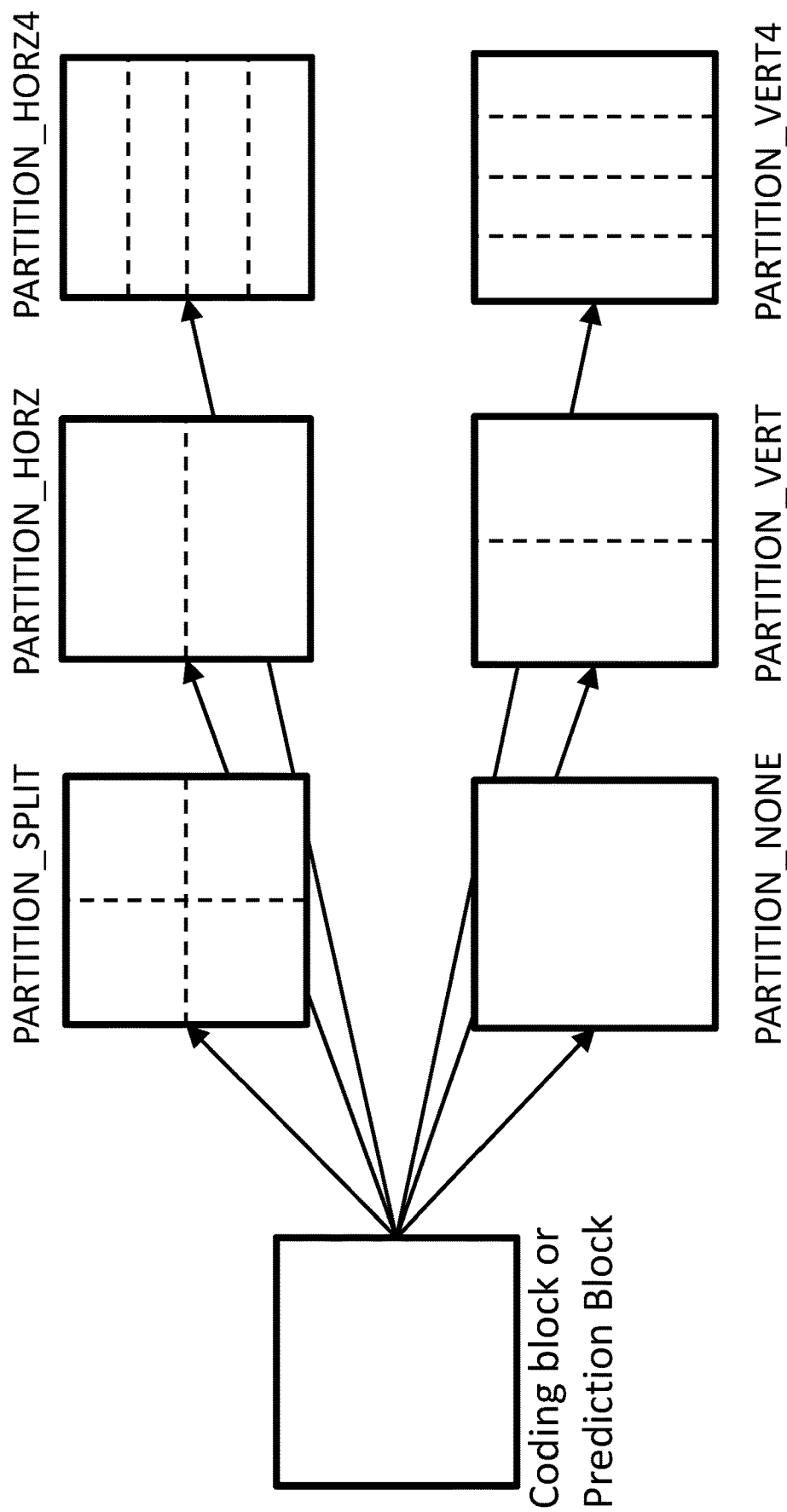
FIG. 17 shows another scheme for partitioning a coding block into multiple transform blocks according to example embodiments of the disclosure.

FIG. 17 further shows another alternative example scheme for partitioning a coding block or prediction block into transform blocks. As shown in FIG. 17, instead of using recursive transform partitioning, a predefined set of partitioning types may be applied to a coding block according a transform type of the coding block. In the particular example shown in FIG. 17, one of the 6 example partitioning types may be applied to split a coding block into various number of transform blocks. Such scheme of generating transform block partitioning may be applied to either a coding block or a prediction block.

In more detail, the partitioning scheme of FIG. 17 provides up to 6 example partition types for any given transform type (transform type refers to the type of, e.g., primary transform, such as ADST and others). In this scheme, every coding block or prediction block may be assigned a transform partition type based on, for example, a rate-distortion cost. In an example, the transform partition type assigned to the coding block or prediction block may be determined based on the transform type of the coding block or prediction block. A particular transform partition type may correspond to a transform block split size and pattern, as shown by the 6 transform partition types illustrated in FIG. 17. A correspondence relationship between various transform types and the various transform partition types may be predefined. An example is shown below with the capitalized labels indicating the transform partition types that may be assigned to the coding block or prediction block based on rate distortion cost:

PARTITION_NONE: Assigns a transform size that is equal to the block size.

PARTITION_SPLIT: Assigns a transform size that is ½ the width of the block size and ½ the height of the block size.

PARTITION_HORZ: Assigns a transform size with the same width as the block size and ½ the height of the block size.

PARTITION_VERT: Assigns a transform size with ½ the width of the block size and the same height as the block size.

PARTITION_HORZ4: Assigns a transform size with the same width as the block size and ¼ the height of the block size.

PARTITION_VERT4: Assigns a transform size with ¼ the width of the block size and the same height as the block size.

In the example above, the transform partition types as shown in FIG. 17 all contain uniform transform sizes for the partitioned transform blocks. This is a mere example rather than a limitation. In some other implementations, mixed transform blocks sizes may be used for the partitioned transform blocks in a particular partition type (or pattern).

The PBs (or CBs, also referred to as PBs when not being further partitioned into prediction blocks) obtained from any of the partitioning schemes above may then become the individual blocks for coding via either intra or inter predictions. For inter-prediction for a current PB, a residual between the current block and a prediction block may be generated, coded, and included in the coded bitstream.

Inter-prediction may be implemented, for example, in a single-reference mode or a compound-reference mode. In some implementations, a skip flag may be first included in the bitstream for a current block (or at a higher level) to indicate whether the current block is inter-coded and is not to be skipped. If the current block is inter-coded, then another flag may be further included in the bitstream as a signal to indicate whether the single-reference mode or compound-reference mode is used for the prediction of the current block. For the single-reference mode, one reference block may be used to generate the prediction block for the current block. For the compound-reference mode, two or more reference blocks may be used to generate the prediction block by, for example, a weighted average. The compound-reference mode may be referred as more-than-one-reference mode, two-reference mode, or multiple-reference mode. The reference block or reference blocks may be identified using reference frame index or indices and additionally using corresponding motion vector or motion vectors which indicate shift(s) between the reference block(s) and the current blocks in location relative to a frame, e.g., in horizontal and vertical pixels. For example, the inter-prediction block for the current block may be generated from a single-reference block identified by one motion vector in a reference frame as the prediction block in the single-reference mode, whereas for the compound-reference mode, the prediction block may be generated by a weighted average of two reference blocks in two reference frames indicated by two reference frame indices and two corresponding motion vectors. The motion vector(s) may be coded and included in the bitstream in various manners.

In some implementations, an encoding or decoding system may maintain a decoded picture buffer (DPB). Some images/pictures may be maintained in the DPB waiting for being displayed (in a decoding system) and some images/pictures in the DPB may be used as reference frames to enable inter-prediction (in a decoding system or encoding system). In some implementations, the reference frames in the DPB may be tagged as either short-term references or long-term references for a current image being encoded or decoded. For example, short-term reference frames may include frames that are used for inter-prediction for blocks in a current frame or in a predefined number (e.g., 2) of closest subsequent video frames to the current frame in a decoding order. The long-term reference frames may include frames in the DPB that can be used to predict image blocks in frames that are more than the predefined number of frames away from the current frame in the order of decoding. Information about such tags for short and long-term reference frames may be referred to as Reference Picture Set (RPS) and may be added to a header of each frame in the encoded bitstream. Each frame in the encoded video stream may be identified by a Picture Order Counter (POC), which is numbered according to playback sequence in an absolute manner or relevant to a picture group starting from, for example, an I-frame.

In some example implementations, one or more reference picture lists containing identification of short-term and long-term reference frames for inter-prediction may be formed based on the information in the RPS. For example, a single picture reference list may be formed for uni-directional inter-prediction, denoted as L0 reference (or reference list 0) whereas two picture referenced lists may be formed for bi-direction inter-prediction, denoted as L0 (or reference list 0) and L1 (or reference list 1) for each of the two prediction directions. The reference frames included in the L0 and L1 lists may be ordered in various predetermined manners. The lengths of the L0 and L1 lists may be signaled in the video bitstream. Uni-directional inter-prediction may be either in the single-reference mode, or in the compound-reference mode when the multiple references for the generation of prediction block by weighted average in the compound prediction mode are on a same side of the frame where the block to be predicted is located. Bi-directional inter-prediction may only be compound mode in that bi-directional inter-prediction involves at least two reference blocks.

In some implementations, a merge mode (MM) for inter-prediction may be implemented. Generally, for the merge mode, the motion vector in single-reference prediction or one or more of the motion vectors in compound-reference prediction for the current PB may be derived from other motion vector(s) rather than being computed and signaled independently. For example, in an encoding system, the current motion vector(s) for the current PB may be represented by difference(s) between the current motion vector(s) and other one or more already encoded motion vectors (referred to as reference motion vectors). Such difference(s) in motion vector(s) rather than the entirety of the current motion vector(s) may be encoded and included in the bit stream and may be linked to the reference motion vector(s). Correspondingly in a decoding system, the motion vector(s) corresponding to the current PB may be derived based on the decoded motion vector difference(s) and decoded reference motion vector(s) linked therewith. As a specific form of the general merge mode (MM) inter-prediction, such inter-prediction based on motion vector difference(s) may be referred to as Merge Mode with Motion Vector Difference (MMVD). MM in general or MMVD in particular may thus be implemented to leverage correlations between motion vectors associated with different PBs to improve coding efficiency. For example, neighboring PBs may have similar motion vectors and thus the MVD may be small and can be efficiently coded. For another example, motion vectors may correlate temporally (between frames) for similarly located/positioned blocks in space.

In some example implementations, an MM flag may be included in a bitstream during an encoding process for indicating whether the current PB is in a merge mode. Additionally, or alternatively, an MMVD flag may be included during the encoding process and signaled in the bitstream to indicate whether the current PB is in an MMVD mode. The MM and/or MMVD flags or indicators may be provided at the PB level, the CB level, the CU level, the CTB level, the CTU level, slice level, frame level, picture level, sequence level, and the like. For a particular example, both an MM flag and an MMVD flag may be included for a current CU, and the MMVD flag may be signalled right after the skip flag and the MM flag to specify whether the MMVD mode is used for the current CU.

In some example implementations of MMVD, a list of reference motion vector (RMV) or MV predictor candidates for motion vector prediction may be formed for a block being predicted. The list of RMV candidates may contain a predetermined number (e.g., 2) of MV predictor candidate blocks whose motion vectors may be used for predicting the current motion vector. The RMV candidate blocks may include blocks selected from neighboring blocks in the same frame (referred to as spatial motion vector predictors, or SMVPs) and/or temporal blocks (e.g., identically located blocks in proceeding or subsequent frames of the current frame, referred to as temporal motion vector predictor, or TMVPs). These options represent blocks at spatial or temporal locations relative to the current block that are likely to have similar or identical motion vectors to the current block. The size of the list of MV predictor candidates may be predetermined. For example, the list may contain two or more candidates. To be on the list of RMV candidates, a candidate block, for example, may be required to have the same reference frame (or frames) as the current block, must exist (e.g., when the current block is near the edge of the frame, a boundary check needs to be performed), and must be already encoded during an encoding process, and/or already decoded during a decoding process. In some implementations, the list of merge candidates may be first populated with spatially neighboring blocks (scanned in particular predefined order) if available and meeting the conditions above, and then the temporal blocks if space is still available in the list. The neighboring RMV candidate blocks, for example, may be selected from left and top blocks of the current bock. The list of RMV predictor candidates may be dynamically formed at various levels (sequence, picture, frame, slice, superblock, etc.) as a Dynamic Reference List (DRL). DRL may be signaled in the bitstream.

In some implementations, an actual MV predictor candidate being used as a reference motion vector for predicting a motion vector of the current block may be signaled. In the case that the RMV candidate list contains two candidates, a one-bit flag, referred to as merge candidate flag may be used to indicate the selection of the reference merge candidate. For a current block being predicted in the compound mode, each of the multiple motion vectors predicted using a MV predictor may be associated with reference motion vector from the merge candidate list. The encoder may determine which of the RMV candidate more closely predicts the MV of a current coding block and signal the selection as an index into the DRL.

In some example implementations of MMVD, after an RMV candidate is selected and used as base motion vector predictor for a motion vector to be predicted, a motion vector difference (MVD or a delta MV, representing the difference between the motion vector to be predicted and the reference candidate motion vector) may be calculated in the encoding system. Such MVD may include information representing a magnitude of MV difference and a direction of the MV difference, both of which may be signaled in the bitstream. The motion difference magnitude and the motion difference direction may be signaled in various manners.

In some example implementations of the MMVD, a distance index may be used to specify magnitude information of the motion vector difference and to indicate one of a set of predefined offsets representing predefined motion vector difference from the starting point (the reference motion vector). An MV offset according to the signaled index may then be added to either horizontal component or vertical component of the starting (reference) motion vector. Whether the horizontal or vertical component of the reference motion vector should be offset may be determined by a directional information of the MVD. An example predefined relation between distance index and predefined offsets is specified in Table 2.

TABLE 2

Example relation of distance index and pre-defined MV offset

| Distance Index | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

In some example implementations of the MMVD, a direction index may be further signaled and used to represent a direction of the MVD relative to the reference motion vector. In some implementations, the direction may be restricted to either one of the horizontal and vertical directions. An example 2-bit direction index is shown in Table 3. In the example of Table 3, the interpretation of the MVD could be variant according to the information of the starting/reference MVs. For example, when the starting/reference MV corresponds to a uni-prediction block or corresponds to a bi-prediction block with both reference frame lists point to the same side of the current picture (i.e. POCs of the two reference pictures are both larger than the POC of the current picture, or are both smaller than the POC of the current picture), the sign in Table 3 may specify the sign (direction) of MV offset added to the starting/reference MV. When the starting/reference MV corresponds to a bi-prediction block with the two reference pictures at different sides of the current picture (i.e. the POC of one reference picture is larger than the POC of the current picture, and the POC of the other reference picture is smaller than the POC of the current picture), and a difference between the reference POC in picture reference list 0 and the current frame is greater than that between the reference POC in picture reference list 1 and the current frame, the sign in Table 3 may specify the sign of MV offset added to the reference MV corresponding to the reference picture in picture reference list 0, and the sign for the offset of the MV corresponding to the reference picture in picture reference list 1 may have an opposite value (opposite sign for the offset). Otherwise, if the difference between the reference POC in picture reference list 1 and the current frame is greater than that between the reference POC in picture reference list 0 and the current frame, the sign in Table 3 may then specify the sign of MV offset added to the reference MV associated with the picture reference list 1 and the sign for the offset to the reference MV associated with the picture reference list 0 has opposite value.

TABLE 3

Example implementations for sign of MV offset specified by direction index

| Direction IDX | 00 | 01 | 10 | 11 |
|---|---|---|---|---|
| x-axis (horizontal) | + | − | N/A | N/A |
| y-axis (vertical) | N/A | N/A | + | − |

In some example implementations, the MVD may be scaled according to the difference of POCs in each direction. If the differences of POCs in both lists are the same, no scaling is needed. Otherwise, if the difference of POC in reference list 0 is larger than the one of reference list 1, the MVD for reference list 1 is scaled. If the POC difference of reference list 1 is greater than list 0, the MVD for list 0 may be scaled in the same way. If the starting MV is uni-predicted, the MVD is added to the available or reference MV.

In some other example implementations for MV prediction, a harmonized scheme may be used to implement a general merge mode, MMVD, and some other types of MV prediction, for both single-reference mode and compound-reference mode MV prediction. Various syntax elements may be used to signal the manner in which the MV for a current block is predicted.

For example, for single-reference mode, the following MV prediction modes may be signaled:

NEARMV—use one of the motion vector predictors (MVP) in the list indicated by a DRL (Dynamic Reference List) index directly without any MVD.

NEWMV—use one of the motion vector predictors (MVP) in the list signaled by a DRL index as reference and apply a delta to the MVP (e.g., using MVD).

GLOBALMV—use a motion vector based on frame-level global motion parameters.

Likewise, for the compound-reference inter-prediction mode using two reference frames corresponding to two MVs to be predicted, the following MV prediction modes may be signaled:

NEAR_NEARMV—use one of the motion vector predictors (MVP) in the list signaled by a DRL index without MVD for each of the two of MVs to be predicted.

NEAR_NEWMV—for predicting the first of the two motion vectors, use one of the motion vector predictors (MVP) in the list signaled by a DRL index as reference MV without MVD; for predicting the second of the two motion vectors, use one of the motion vector predictors (MVP) in the list signaled by a DRL index as reference MV in conjunction with an additionally signaled delta MV (an MVD).

NEW_NEARMV—for predicting the second of the two motion vectors, use one of the motion vector predictors (MVP) in the list signaled by a DRL index as reference MV without MVD; for predicting the first of the two motion vectors, use one of the motion vector predictors (MVP) in the list signaled by a DRL index as reference MV in conjunction with an additionally signaled delta MV (an MVD).

NEW_NEWMV—use one of the motion vector predictors (MVP) in the list signaled by a DRL index as reference MV and use it in conjunction with an additionally signaled delta MV to predict for each of the two MVs.

GLOBAL_GLOBALMV—use MVs from each reference based on their frame-level global motion parameters.

The term "NEAR" above thus refers to MV prediction using a reference MV without any MVD as a general merge mode, whereas the term "NEW" refers to MV prediction involving using a reference MV and offsetting it with a signaled or derived MVD as in an MMVD mode. For the compound inter-prediction, both the reference base motion vectors and the motion vector deltas above, may be generally different or independent between the two references or the two MVDs, even though the two MVDs, for example, may be correlated and such correlation may be leveraged to reduce the amount of information needed for signaling the two motion vector deltas. To leverage such correlation, a joint signaling of the two MVDs may be implemented and indicated in the bitstream, as described in further detail below.

In some example implementations of MVD, a predefined set of pixel resolutions for the MVD may be allowed. The allowed MVD pixel resolutions may be integer or fractional. For example, the allowable set of MVD pixel resolutions may include but are not limited to 8, 4, 2, 1, ½, ¼, and ⅛ pixels. These pixel resolutions or precisions may be used adaptively. For example, an encoder may search all supported precision values and identify the best precision for encoding and for signaling a decoder. In some example implementations, the allowable resolutions may be organized in sets according to a plurality of frame level maximum precisions, e.g., in two precision sets shown below:

TABLE 4

Supported MV precisions in two sets

| Frame level maximum precision | Supported MV precisions |
|---|---|
| ⅛ | ⅛, ½, 1, 4 |
| ¼ | ¼, 1, 4, 8 |

Turning to entropy coding, the various syntax elements of the video stream may be coded based on context adaptive binary arithmetic coding (CABAC). In some other implementations, rather than binary symbols, an M-ary arithmetic coding engine may be implemented for encoding a sequence of multilevel symbols. For example, each syntax element may be associated with an alphabet of M elements, where M can be any integer value between, for example, 2 and 16. The input to the encoding is a sequence of M-ary symbols. A coding context may correspondingly consist of a set of M probabilities, represented by a cumulative distribution function (CDF). The probabilities in a coding context may be updated after coding/parsing each syntax element. The cumulative distribution functions may be represented by arrays of M 15-bit integers (in a fixed-point precision) as follows:

$$C=[c_0, c_1, \ldots, c_{(M-2)}, 2^{15}], \quad (1)$$

where $c_n/32768$ represents the probability of the symbol being less than or equal to n. In some example implementations, the probability update may be performed using the following equations:

$$\begin{cases} c_m = c_m \cdot (1-\alpha) & m \in [0, \text{symbol}) \\ c_m = c_m + \alpha \cdot (1-c_m) & m \in [\text{symbol}, M-1) \end{cases}, \quad (2)$$

where $\alpha$ is the probability update rate that adapts based on the number of times the symbol has been decoded (up to a maximum of, for example, 32) and m is the index of the element in the CDF. This adaptation of $\alpha$ allows faster probability updates at the beginning of coding/parsing the syntax elements. The M-ary arithmetic coding process follows the conventional arithmetic coding engine design. However, in some example implementations, only the most significant number of bits, e.g., 9 bits, of the 15-bit probability values are input to the arithmetic encoder/decoder.

In some example implementations, for each transform block, entropy coding of transform coefficients may start by coding an all_zero flag, which indicates whether all the quantized transform coefficients in the transform block are zero. If the all_zero flag is signaled as 0, it may be followed by signaling a primary transform kernel type, an end-of-block (EOB) position, and secondary transform kernel index. Thereafter, the transform coefficient values may be coded with multiple level maps together with sign values. For example, the level maps may be coded as three level planes, e.g., lower-level, middle-level, and higher-level planes, and the signs of the transform coefficients may be coded as a separate plane. The lower, middle, and higher-level planes may correspond to different ranges of coefficient magnitudes (e.g., 0-2, 3-14, 15 and above, respectively). In some example implementations, the three level planes may be coded as follows. After the EOB value is coded, the lower and middle-level planes may be coded together in backward scanning order (where the scanning order refers to a scan applied on the transform coefficients of the current transform block). The scanning order can be one of but is not limited to zig-zag scan, diagonal scan, horizontal scan, and vertical scan, depending on a transform block size and transform type being applied. Then, the sign plane and higher-level plane may be coded together in a forward scan order. Thereafter, the remainder (coefficient magnitude minus 14) may be entropy coded using, for example, an Exp-Golomb code.

In some example implementations, the context model applied to the lower-level plane may depend on 1) the primary transform directions, namely, one of bi-directional, horizontal, and vertical transform directions; 2) the transform block size; and 3) up to five neighboring transform domain coefficients. The middle-level plane may use a similar context model, but the number of context-determining neighbor coefficients may be reduced, for example, from 5 to 2. The higher-level plane may be coded using an Exp-Golomb code without using context modeling. For the sign plane, with the exception of the DC sign, which may be coded using the DC signs from neighboring transform units, sign values of all other transform coefficients may be coded directly without context modeling.

Turning specifically to entropy coding of syntax elements related to inter-prediction mode, such syntax elements may be coded based on context adaptive arithmetic coding. Such syntax elements may include but are not limited to an indicator for single mode inter-prediction (denoted by "inter_single_mode"), an indicator for compound mode inter-prediction (denoted by "inter_comp_mode"), an indicator for optical-flow mode ("denoted by use_optical_flow"), and dynamic motion vector reference list (DRL) index for specifying a motion vector predictor in the DRL with or without motion vector difference (MVD) (denoted by "drl_index"). Some of these syntax elements are binary. Others may be non-binary. For example, an DRL index for DRL lists that are longer than 2 may not be binary. Non-binary syntax elements may either be binarized and coded based on two-symbol context adaptive binary arithmetic coding, or multi-symbol context adaptive arithmetic coding.

Each of these syntax elements relating to inter-prediction may be coded using an appropriately selected context for optimal coding efficiency. In some implementations, a set of contexts may be provided for selection during a coding/decoding process of a particular syntax element. In some implementations, a number of possible contexts and the selection thereof during a coding/decoding process of a prediction block may depend on coding mode and coding information of spatially neighboring blocks of the current coding block in the same frame or temporal motion information of the current coding block, reflecting statistical correlation between coding and motion vectors of these blocks and the current coding block.

In some example implementations, context derivation (including both the number of possible contexts and the selection of a particular context depending on the dynamic coding information) may be designed to be based on or derived from one or more context parameters. These context parameters may further depend on the coding information related to the spatially neighboring blocks and/or temporal motion vector predictors of the current coding block.

In some example implementations, a first context parameter, denoted by "newmv_ctx," may be derived to represent an estimated likelihood that the current prediction (or transform) block uses motion vector prediction with both motion vector predictors and motion vector difference. A second context parameter, denoted by "refmv_ctx" may be derived to represent an estimated likelihood that the current prediction (or transform) uses a motion vector predictor directly without motion vector difference. A third context parameter, denoted by "zeromv_tx" may be derived to represent an estimated likelihood that the current prediction (or transform) block use global motion vector predictor.

Figure 18:
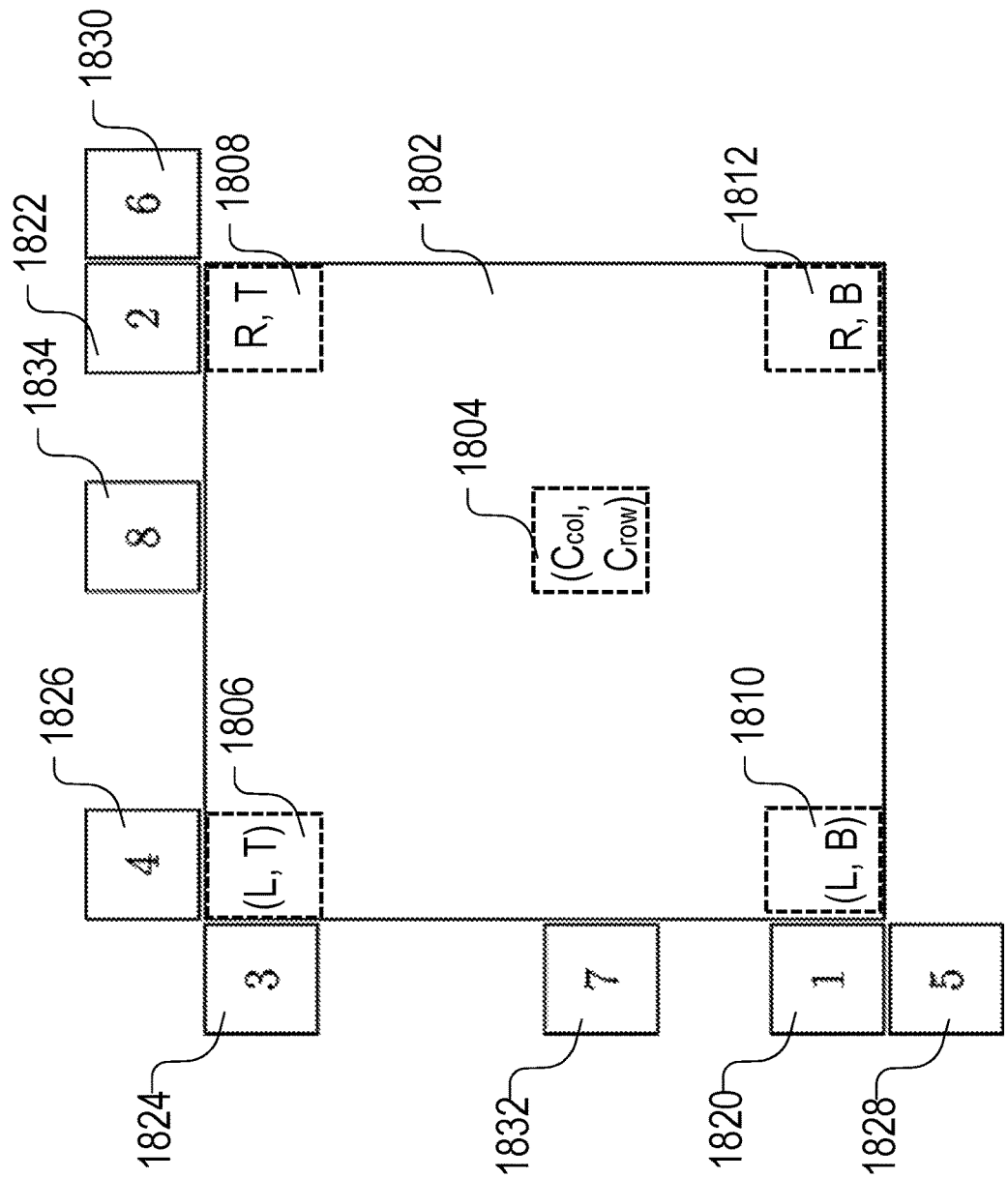
FIG. 18 illustrates spatial neighboring blocks of a current coding block for inter prediction mode coding context derivation.

In some example implementations, these context parameters may be derived from coding properties and information of spatially neighboring blocks and/or temporal motion vector predictor information of the current coding block. An example is shown in FIG. 18. FIG. 18 shows a coding block (e.g., a super block) 1802 which may include a plurality of prediction or transform blocks distributed in a row direction and a column direction. In the example of FIG. 18, the coding block 1802 contains 6 rows and 6 columns of prediction blocks (which is assumed to be the same as the transform blocks, and referred to as "blocks"). Each block may be associated with a block position represented by a pair of column and row coordinates (e.g., relative to the frame or other reference objects in the frame). The top-left block 1806 may be associated with a block coordinate of (L, T). The top-right block 1808 may be associated with a block coordinate of (R, T). The bottom-left block 1810 may be associated with a block coordinate of (L, B). The bottom-right block 1812 may be associated with a block coordinate of (R, B). The current block is indicated as 1804 with a block coordinate of ($C_{col}$, $C_{row}$).

In some implementations, a predefined or signaled set of spatially neighboring blocks of the current coding block 1802 may be scanned and examined in order to determine one or more of the context parameters above. The predefined or signaled positions of the set of neighboring blocks to scan and the order in which they are scanned may be based on general statistics or based on real-time statistics of correlation between the coding properties of neighboring blocks and the current block 1804. In the example implementation illustrated in FIG. 18, a set of neighboring blocks immediately to the left and immediately above the current coding block 1802 may be scanned in the order specified in FIG. 18. These are the nearest neighboring blocks that are coded/decoded before the current coding block 1802. The scan of these nearest spatial neighboring blocks, for example, may follow a same manner of scanning for the MVP list (DRL list construction). For example, the scan may follow the order of:

1. Neighbor block 1820 at bottom and immediately to the left of the coding block 1802 with block coordinate (L−1, B).
2. Neighbor block 1822 at right end and immediately above the coding block 1802 with block coordinate (R, T−1).
3. Neighbor block 1824 at top and immediately to the left of the coding block 1802 with block coordinate (L−1, T).
4. Neighbor block 1826 at left end and immediately above the coding block 1802 with block coordinate (L, T−1).
5. Neighbor block 1828 immediately below and to the left of the bottom-left corner of the coding block 1802 with block coordinate (L−1, B−1).
6. Neighbor block 1830 immediately above and to the right of the top-right corner of the coding block 1802 with block coordinate (R−1, T−1).
7. Neighbor block 1832 at same row as the current block 1804 and immediately to the left end of the coding block 1802 with block coordinate (L−1, $C_{row}$).
8. Neighbor block 1834 at same column as the current block 1804 and immediately above coding block 1802 with block coordinate ($C_{col}$, T−1).

In some example implementation, the scanning through these spatially neighboring blocks may be performed to check whether they share at least one reference frame for inter prediction with the current block 1804. A number of blocks among these neighboring blocks that do share reference frames with the current block 1804 may be tracked. The numbers of reference-frame matching blocks in the left neighboring column (among blocks 1820, 1824, 1828, and 1832 of FIG. 18) and among the above neighboring row (among blocks 1822, 1826, 1830, and 1834) may be separately tracked, denoted by col_match_count and row_match_count, respectively.

In some example implementations, the scanning through these immediately left and above spatially neighboring blocks may also be performed to check a number of these blocks that are inter-predicted based on MVD (e.g., the blocks that new MV mode involving motion vector predictor and MVD, as described above), the number or count being denoted as newmv_count.

In some example implementations, a reference frame matching parameter may be derived based on the row and column counts of nearest neighbor blocks having matching reference frames with the current coding block 1804. For example, such a reference frame matching parameter may be derived as:

$$\text{nearest\_match}=(\text{row\_match\_count}>0)+(\text{col\_match\_count}>0) \quad (3)$$

where the ( ) operator returns "1" or "0" depending on the logic expression enclosed therein is true or false, respectively. As such, nearest_match has 3 possible values (0, 1, and 2) according to the derivation above.

In some example implementations, two of the three context parameters above, newmv_ctx and remv_ctx, may be derived from nearest_match and newmv_count. For example:

$$\text{newmv\_ctx}=2*\text{nearest\_match}+(\text{newmv\_count}>0) \quad (4)$$

$$\text{refmv\_ctx}=2*\text{nearest\_match}+(\text{newmv\_count}<3) \quad (5)$$

In the derivation above, "2*" operation effectively is a left bit shift. As such, newmv_ctx and refmv_ctx each have 6 possible values (0-5)

In some example implementations, to derive the third context parameters above, zeromv_ctx (representing global MV context), temporal motion vector prediction (TMVP) candidate at the top left position inside spatially co-located coding block of the current coding block 1802 in a different temporal frame may be checked. If this TMVP candidate is not available, or one component (horizontal or vertical) of the motion vector difference between this TMVP candidate and the global MV is greater than a threshold (2 pel, for example), the zeromv_ctx context parameter may be set as 1, otherwise the it may be set as 0.

In some example implementations, contexts for the various inter-prediction related syntax elements may be derived based on one or more of the context parameters above, In particular, coding context for syntax elements including but not limited to drl_index, inter_single_mode, inter_comp_mode, and use_optical_flow may be derived from one or more these context parameters. For example, coding contexts for these syntax elements may be derived depending on newmv_ctx, refmv_ctx, and zeromv_ctx, as following:

$$drl\_index\_ctx0 = 2*newmv\_ctx + zeromv\_ctx(12 \text{ possible contexts}) \quad (6)$$

$$drl\_index\_ctx1 = 2*newmv\_ctx + zeromv\_ctx(12 \text{ possible contexts}) \quad (7)$$

$$drl\_index\_ctx2 = 2*newmv\_ctx + zeromv\_ctx(12 \text{ possible contexts}) \quad (8)$$

$$inter\_single\_mode\_ctx = 2*2*newmv\_ctx + \quad (9)$$
$$2*zeromv\_ctx + isrefmv\_ctx[refmv\_ctx](24 \text{ possible contexts})$$

where $isrefmv[6] = \{0,0,1,0,1,0\}$.

$$inter\_comp\_mode\_ctx = comp\_mode\_ctx \quad (10)$$
$$\_map[refmv\_ctx >> 1][MIN(newmv\_ctx, 4)](8 \text{ possible contexts})$$

where $comp\_mode\_ctx\_map[3][5] = \{0,1,1,1,1\}, \{1,2,3,4,4\}, \{4,4,5,6,7\}\}$ $$use\_optical\_flow\_ctx = comp\_mode\_ctx \quad (11)$$
$$\_map[refmv\_ctx >> 1][MIN(newmv\_ctx, 4)](8 \text{ possible contexts})$$

where $comp\_mode\_ctx\_map[3][5] = \{0,1,1,1,1\}, \{1,2,3,4,4\}, \{4,4,5,6,7\}\}$ In the above, it is assumed that the drl_index includes three bits and each of the three bits may be coded with different context, as specified by drl_index_ctx0, drl_index_ctx1, and drl_index_ctx2. The values derived above may be used to specify a context (e.g., as an index to a group of contexts) to be used for the corresponding syntax element or a bit of the syntax element. The number of the group of possible contexts for each of the syntax elements is also indicated in the equations above.

In the various example implementations above, there is a relatively large number of possible contexts for each of the various inter-prediction related syntax elements for the encoder/decoder to maintain. The complexity may negatively affect the efficiency of the parsing process. In addition, the scanning process in abstaining the various counts above is also of certain complexity. The additional disclosure below is included to provide simplified example implementations that either reduce the number of contexts or simplify the scanning process.

In some implementations, the third context parameter zeromv_ctx may not need to be derived, and correspondingly, the derivation of the inter mode contexts above, to the extent that they depend on zeromv_ctx, may be modified to remove their dependence on zeromv_ctx. For example, the coding context derivation for the drl_index and the inter_single_mode among the various syntax elements may be modified to:

$$drl\_index\_ctx0 = newmv\_ctx(6 \text{ possible contexts}) \quad (12)$$

$$drl\_index\_ctx1 = newmv\_ctx(6 \text{ possible contexts}) \quad (13)$$

$$drl\_index\_ctx2 = newmv\_ctx(6 \text{ possible contexts}) \quad (14)$$

$$inter\_single\_mode\_ctx = 2*newmv\_ctx + isrefmv\_ctx[refmv\_ctx] (12 \text{ possible contexts}) \quad (15)$$

where $isrefmv[6] = \{0,0,1,0,1,0\}$,

The numbers of possible coding contexts for each of these syntax elements are thus reduced two-fold. The "2*" operator for drl_index of Eqs. (7) and (8) and one of the two "2*" operators in Eq. (9) are not necessary and are thus also removed in the implementation above in Eqs. (12)-(15) because it does not affect the number of possible contexts once the dependency on zeromv_ctx is removed.

Further in the example implementations above, the inter single mode context may be designed to be derived only depending on the newmv_ctx among the context parameters above:

$$inter\_single\_mode\_ctx = newmv\_ctx(6 \text{ possible contexts}) \quad (16)$$

thereby reducing possible contexts for inter_single_mode to 6 from either 12 or 24. Again, the double "2*" operators of Eq. (9) is unnecessary because it does not affect the number of possible contexts once the dependency on zeromv_ctx is removed.

In some example implementations, the coding context for inter_comp_mode and/or use_optical_flow may be designed to be derived only depending on the newmv_ctx:

$$inter\_comp\_mode\_ctx = newmv\_ctx(6 \text{ possible contexts}) \quad (17)$$

$$use\_optical\_flow\_ctx = newmv\_ctx(\text{possible contexts}) \quad (18)$$

thereby removing the mapping design in Eqs. (10) and (11) and reducing the number of possible contexts for each of inter_comp_mode and use_optical_flow to 6 from 8.

In some example implementations, the drl_index contexts may be designed to be derived only depending on the newmv_ctx:

$$drl\_index\_ctx0 = newmv\_ctx(6 \text{ possible contexts}) \quad (19)$$

$$drl\_index\_ctx1 = newmv\_ctx(6 \text{ possible contexts}) \quad (20)$$

$$drl\_index\_ctx2 = newmv\_ctx(6 \text{ possible contexts}) \quad (21)$$

This achieves the same outcome for the design of Eq. (12-14) above where the drl_index contexts are designed to remove dependence on zeromv_ctx and where the numbers of possible contexts drl_index contexts are reduced to 6 each. Again, the "2*" operator for drl_index of Eqs. (7) and (8) are unnecessary because it does not affect the number of contexts in Eqs. (20) and (21).

In some example implementations, the coding contexts for the various syntax elements related to the inter prediction mode may be designed to only depend on the mode information of spatial neighboring blocks. For example, among the three example context parameters above, newmv_ctx and refmv_ctx depend on spatial neighboring blocks whereas zeromv_ctx depends on TMVP information. Thus, according these implementations of context design for the various syntax elements related to the inter prediction mode, the dependency on newmv_ctx and refmv_ctx may be retained, whereas the dependency on zeromv_ctx may be removed. Unnecessary "2*" operator may also be removed accordingly.

In some example embodiments, context design and selection for drl_index may be reduced by only context-coding its first N bits with probability distribution that needs to be signaled or that are non-equal, and coding the rest of the bits using equal probability. Here, N is a positive integer. For example, if N equals to 2, only drl_index_ctx0 and drl_index_ctx1 is used, the drl_index_ctx2 is discarded and an equal probability is used for coding drl_index[2]. The value of N can be either predefined both at the encoder side and the decoder side or signaled at the high-level syntax into the bitstream.

In some example implementations, reduction of the numbers of possible contexts for the various inter prediction mode syntaxes may be achieved by modified designs for the derivation of the various parameters above including but not limited to nearest_match. For example, the number of possible values for nearest_match may be reduced. The number of possible values for the context parameters that depend on them such as newmv_ctx and refmv_ctx would correspondingly be reduced. For example, in some implementations, instead of calculating the sum of the two Boolean value of whether top row and left column immediate neighboring blocks have at least one matched reference frame with the current block, i.e., (Eq. (3), nearest_match=row_match_count>0)+(col_match_count>0)), an "OR" operation may be performed between these Boolean values, e.g., nearest_match=row_match_count>0)/(col_match_count>0). In other words, nearest_match becomes binary with only two possible values of "0" or "1" in such example implementations.

Specifically, in some example implementations, the context parameters newmv_ctx and refmv_ctx may be derived as follows:

$$\text{nearest\_match}=(\text{row\_match\_count}>0)\|(\text{col\_match\_count}>0) \quad (22)$$

$$\text{newmv\_ctx}=2*\text{nearest\_match}+(\text{newmv\_count}>0) \quad (23)$$

$$\text{refmv\_ctx}=2*\text{nearest\_match}+(\text{newmv\_count}<3) \quad (24)$$

thereby reducing the possible values of newmv_ctx and refmv_ctx to 0-3 (4 possible values).

In some example implementations, the possible values of newmv_ctx and refmv_ctx parameters may be further reduced by removing the "2*" operator above, by using the example derivation below:

$$\text{nearest\_match}=(\text{row\_match\_count}>0)\|(\text{col\_match\_count}>0) \quad (25)$$

$$\text{newmv\_ctx}=\text{nearest\_match}+(\text{newmv\_count}>0) \quad (26)$$

$$\text{refmv\_ctx}=\text{nearest\_match}+(\text{newmv\_count}<3) \quad (27)$$

thereby reducing the possible values of newmv_ctx and refmv_ctx to 0-2 (3 possible values).

In some further example implementations, the refmv_ctx parameter may be further simplified to remove its dependency on newmv_count:

$$\text{nearest\_match}=(\text{row\_match\_count}>0)\|(\text{col\_match\_count}>0) \quad (28)$$

$$\text{newmv\_ctx}=2*\text{nearest\_match}+(\text{newmv\_count}>0) \quad (29\text{-}1)$$

$$\text{refmv\_ctx}=\text{nearest\_match} \quad (30\text{-}1)$$

thereby further reduce the value for refmv_ctx to 0-1 (binary, with 2 possible values). The "2*" operator may or may not be included.

Likewise, in some alternative example implementations, the newmv_ctx parameter may instead be further simplified to remove its dependency on newmv_count:

$$\text{nearest\_match}=(\text{row\_match\_count}>0)\|(\text{col\_match\_count}>0)$$

$$\text{newmv\_ctx}=\text{nearest\_match} \quad (29\text{-}2)$$

$$\text{refmv\_ctx}=2*\text{nearest\_match}+(\text{newmv\_count}>0) \quad (30\text{-}2)$$

thereby further reduce the value for newmv_ctx to 0-1 (binary, with 2 possible values). The "2*" operator may or may not be included.

In some alternative example implementations, during the derivation of the newmv_ctx, and refmv_ctx, instead of calculating the weighted sum of nearest_match and the Boolean value of whether newmv_count is greater than 0 or less than 3, alternative derivation formula may be used to reduce the number possible values of the context parameters of newmv_ctx, and refmv_ctx For example, the newmv_ctx and refmv_ctx may be derived as follows by removing the "2*" operator from Eqs. (4) and (5):

$$\text{newmv\_ctx}=\text{nearest\_match}+(\text{newmv\_count}>0) \quad (31)$$

$$\text{refmv\_ctx}=\text{nearest\_match}+(\text{newmv\_count}<3) \quad (32)$$

thereby reducing their possible values to 0-3 (4 possible values) when nearest_match takes the sum form above with respect to (row_match_count>0) and (col_match_count>0), and to 0-2 (3 possible values) when nearest_match takes the OR form above with respect to (row_match_count>0) and (col_match_count>0).

In some example implementations, the context parameters of newmv_ctx and refmv_ctx may be derived as follows by ORing rather than summing their derivation components:

$$\text{newmv\_ctx}=\text{nearest\_match}\|(\text{newmv\_count}>0) \quad (33)$$

$$\text{refmv\_ctx}=\text{nearest\_match}\|(\text{newmv\_count}<3) \quad (34)$$

thereby rendering them binary and reducing their possible values to 0-1 (2 possible values) when nearest_match takes the OR form above with respect to (row_match_count>0) and (col_match_count>0). The sum form of nearest_match with respect to (row_match_count>0) and (col_match_count>0) above may not be applicable because of the OR operation in Eqs. (33) and (34).

In some alternative example implementations, the context parameters of newmv_ctx and refmv_ctx may be derived by removing their dependency on newmv_count:

$$\text{newmv\_ctx}=\text{nearest\_match} \quad (35)$$

$$\text{refmv\_ctx}=\text{nearest\_match} \quad (36)$$

thereby reducing their possible values to 0-2 (3 possible values) when nearest_match takes the sum form above with respect to (row_match_count>0) and (col_match_count>0), and to 0-1 (2 possible values) when nearest_match is binary and takes the OR form above with respect to (row_match_count>0) and (col_match_count>0).

The above example implementations provide manners for reducing numbers of possible values for the various parameters used for deriving the context parameters. In some other example implementations, either alternatively or additionally, the number of spatially neighboring blocks to be scanned may be reduced and the order in which they are scanned may be designed, such that the complexity of scanning and or number of possible values of the various parameters above for the derivation of coding context for the syntaxes related to inter prediction mode are reduced.

In some example implementations, during the determination of col_match_count, row_match_count, and newmv_count above, only the first M adjacent spatial candidate blocks may be scanned, the order in which the spatial candidate blocks are scanned may be predefined or signaled. M is a positive integer. The value of M may be predefined both at the encoder and the decoder side or signaled at the high-level syntax into the bitstream.

For example, the scanning order of the M spatial candidate may be the same as the scanning order of MVP list construction as shown in FIG. 18.

For example, only the first M=2 candidates are scanned to derive the newmv_ctx and refmv_ctx. For another example, only the first four candidates are scanned to derive newmv_ctx and refmv_ctx.

In some example implementations, a scanning order other than the one shown in FIG. 18 may be followed. For example, the nearest neighbors in FIG. 18 may be scanned in the order of 2, 1, 4, 3 for M=4.

In some example implementations, the value M may be applied to the scanning for each of col_match_count, row_match_count, and newmv_count. For example, up to M nearest top row neighboring blocks may be scanned to determine row_match_count. Likewise, up to M left row neighboring blocks may be scanned to determine col_match_ count. Likewise, up to M nearest top row and left column of neighboring blocks may be scanned to determine newmv_count in the predefined or signaled scanning order. In some alternative implementations, for the determination of col_match_count and row_match_count, M may be applied in aggregation. That is, the total number of top row and left column of neighboring blocks being scanned for determining these counts may not exceed M. For example, If M=4, then up to 2 top row of neighboring blocks may be scanned for determining row_match_count and up to 2 left column of neighboring blocks may be scanned for determining col_match_count.

In some example implementations, the first M adjacent spatial candidate blocks may be scanned with predefined or signaled scanning order to determine the parameters needed for deriving newmv_ctx and refmv_ctx. Out of the M scanned candidate blocks, K of them may be used to determine the parameters for deriving newmv_ctx whereas L of them may be used to determine the parameters for deriving refmv_ctx. L and K may be positive integers not greater than M.

Turing to the determination of the third context parameter zeromv_ctx related to TMVP, instead of setting the value of zeromv_ctx to either "0" or "1" by checking TMVP candidate at the top-left position inside spatially co-located coding block of the current coding block 1802 of FIG. 18 in a different temporal frame to see if it is not available or not and comparing one component (horizontal or vertical) of the motion vector difference between this TMVP candidate and the global MV to see if that is greater than a threshold (2 pel, for example), TMVPs in other positions may be used. In some implementations, the TMVP corresponding to the top-left position of the current coding block and one or more TMVP candidate at the flowing positions may be checked for availability and compared with the global MV:

1. the central position TMVP candidate
2. the bottom-right TMVP candidate

In some implementations, TMVPs at the one or more above listed positions may be checked for availability and compared with the global MV in order determine the zeromv_ctx parameter. In other words, any combination of TMVPS of top-left, central, and bottom-right positions may be checked for availability and compared with the global MV in order determine the zeromv_ctx parameter.

Figure 19:
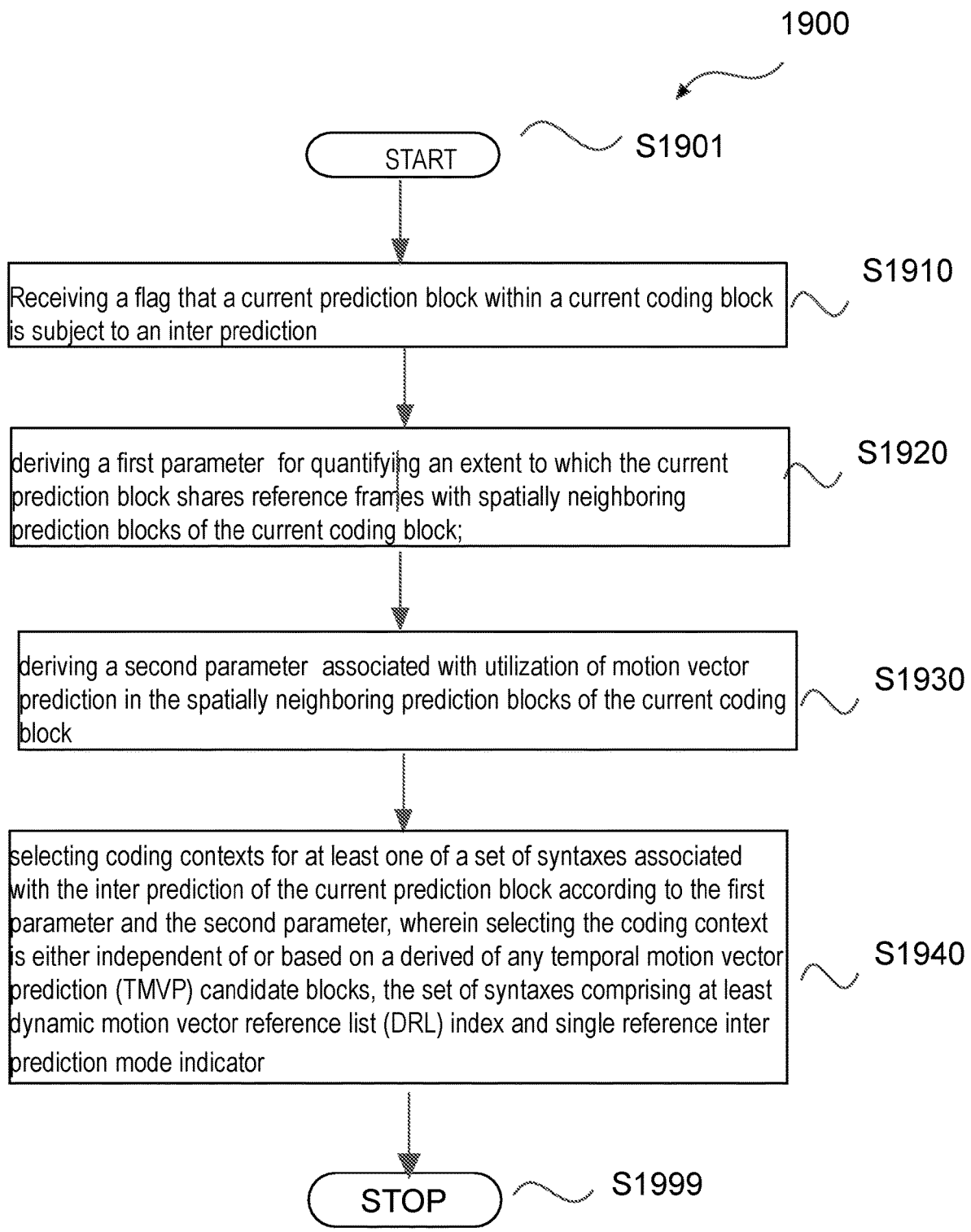
FIG. 19 shows a flow chart of a method according to an example embodiment of the disclosure.

FIG. 19 shows a flow chart 1900 of an example method following the principles underlying the implementations above. The example method flow starts at S1901. In S1910, a flag indicating that the current prediction block is subject to an inter prediction is received. In S1920, a first parameter for quantifying an extent to which the current prediction block shares reference frames with spatially neighboring prediction blocks of the current coding block is derived. In S1930, a second parameter associated with utilization of motion vector prediction in the spatially neighboring prediction blocks of the current coding block is also derived. In S1940, coding contexts for at least one of a set of syntaxes associated with the inter prediction of the current prediction block are selected according to the first parameter and the second parameter, wherein selecting the coding context is either independent of or further based on a derived value of any temporal motion vector prediction (TMVP) candidate blocks, the set of syntaxes comprising at least dynamic motion vector reference list (DRL) index and single reference inter prediction mode indicator. The example method stops at S1999.

Figure 20:
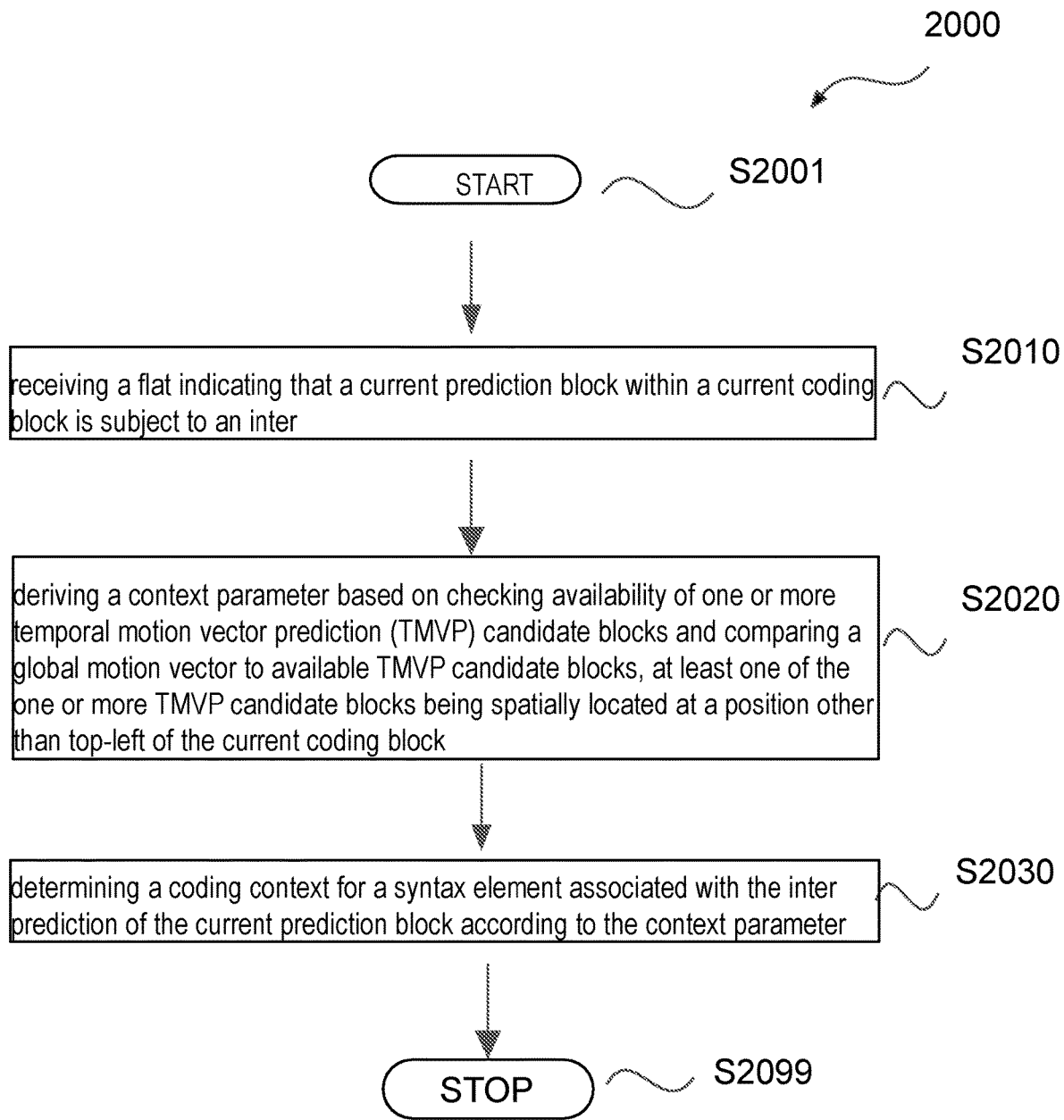
FIG. 20 shows a flow chart of a method according to another example embodiment of the disclosure.

FIG. 20 shows a flow chart 2000 of an example method following the principles underlying the implementations above. The example method flow starts at S2001. In S2010, a flag indicating that a current prediction block within a current coding block is subject to an inter prediction is received. In S2020, a context parameter is derived based on checking availability of one or more temporal motion vector prediction (TMVP) candidate blocks and comparing a global motion vector to available TMVP candidate blocks, at least one of the one or more TMVP candidate blocks being spatially located at a position other than top-left of the current coding block. In S2030, a coding context for a syntax element associated with the inter prediction of the current prediction block is selected according to the context parameter. The example method stops at S2099.

In the embodiments and implementation of this disclosure, any steps and/or operations may be combined or arranged in any amount or order, as desired. Two or more of the steps and/or operations may be performed in parallel. Embodiments and implementations in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block. The term block may be interpreted as a prediction block, a coding block, or a coding unit, i.e. CU. The term block here may also be used to refer to the transform block. In the following items, when saying block size, it may refer to either the block width or height, or maximum value of width and height, or minimum of width and height, or area size (width*height), or aspect ratio (width:height, or height:width) of the block.

The techniques described above, can be implemented as computer software using computer-readable instructions and physically stored in one or more computer-readable media.

Figure 21:
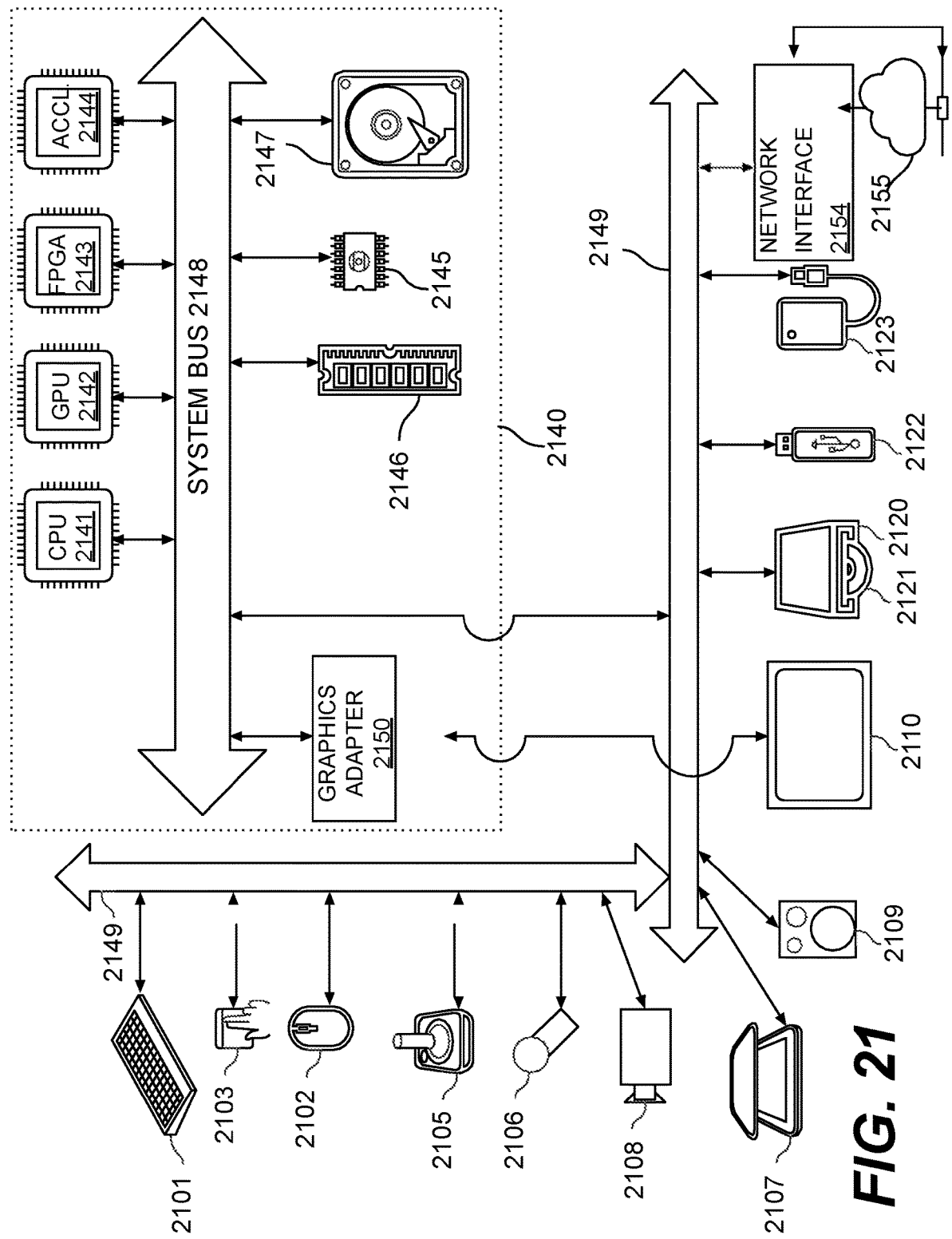
FIG. 21 shows a schematic illustration of a computer system in accordance with example embodiments of the disclosure.

For example, FIG. 21 shows a computer system (2100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 21 for computer system (2100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2100).

Computer system (2100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2101), mouse (2102), trackpad (2103), touch screen (2110), data-glove (not shown), joystick (2105), microphone (2106), scanner (2107), camera (2108).

Computer system (2100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2110), data-glove (not shown), or joystick (2105), but there can also be tactile feedback devices that do not serve as input devices), audio output devices (such as: speakers (2109), headphones (not depicted)), visual output devices (such as screens (2110) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2100) can also include human accessible storage devices and their associated media such as optical media including CD/DVD ROM/RW (2120) with CD/DVD or the like media (2121), thumb-drive (2122), removable hard drive or solid state drive (2123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2100) can also include an interface (2154) to one or more communication networks (2155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth. Certain networks commonly require external network interface adapters that attached to certain general-purpose data ports or peripheral buses (2149) (such as, for example USB ports of the computer system (2100)); others are commonly integrated into the core of the computer system (2100) by attachment to a system bus as described below (for example Ethernet interface into a PC computer system or cellular network interface into a smartphone computer system). Using any of these networks, computer system (2100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2140) of the computer system (2100).

The core (2140) can include one or more Central Processing Units (CPU) (2141), Graphics Processing Units (GPU) (2142), specialized programmable processing units in the form of Field Programmable Gate Areas (FPGA) (2143), hardware accelerators for certain tasks (2144), graphics adapters (2150), and so forth. These devices, along with Read-only memory (ROM) (2145), Random-access memory (2146), internal mass storage such as internal non-user accessible hard drives, SSDs, and the like (2147), may be connected through a system bus (2148). In some computer systems, the system bus (2148) can be accessible in the form of one or more physical plugs to enable extensions by additional CPUs, GPU, and the like. The peripheral devices can be attached either directly to the core's system bus (2148), or through a peripheral bus (2149). In an example, the screen (2110) can be connected to the graphics adapter (2150). Architectures for a peripheral bus include PCI, USB, and the like.

CPUs (2141), GPUs (2142), FPGAs (2143), and accelerators (2144) can execute certain instructions that, in combination, can make up the aforementioned computer code. That computer code can be stored in ROM (2145) or RAM (2146). Transitional data can also be stored in RAM (2146), whereas permanent data can be stored for example, in the internal mass storage (2147). Fast storage and retrieve to any of the memory devices can be enabled through the use of cache memory, that can be closely associated with one or more CPU (2141), GPU (2142), mass storage (2147), ROM (2145), RAM (2146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As a non-limiting example, the computer system having architecture (2100), and specifically the core (2140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2140) that are of non-transitory nature, such as core-internal mass storage (2147) or ROM (2145). The software implementing various embodiments of the present disclosure can be stored in such devices and executed by core (2140). A computer-readable medium can include one or more memory devices or chips, according to particular needs. The software can cause the core (2140) and specifically the processors therein (including CPU, GPU, FPGA, and the like) to execute particular processes or particular parts of particular processes described herein, including defining data structures stored in RAM (2146) and modifying such data structures according to the processes defined by the software. In addition, or as an alternative, the computer system can provide functionality as a result of logic hardwired or otherwise embodied in a circuit (for example: accelerator (2144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

APPENDIX A

| Acronyms | |
|---|---|
| JEM: joint exploration model | ROM: Read-Only Memory |
| VVC: versatile video coding | RAM: Random Access Memory |
| BMS: benchmark set | ASIC: Application-Specific Integrated Circuit |
| MV: Motion Vector | PLD: Programmable Logic Device |
| MVD: Motion Vector difference | LAN: Local Area Network |
| MMVD: Merge Mode with Motion Vector Difference | GSM: Global System for Mobile communications |
| HEVC: High Efficiency Video Coding | LTE: Long-Term Evolution |
| SEI: Supplementary Enhancement Information | CANBus: Controller Area Network Bus |
| VUI: Video Usability Information | USB: Universal Serial Bus |
| GOPs: Groups of Pictures | PCI: Peripheral Component Interconnect |
| TUs: Transform Units, | FPGA: Field Programmable Gate Areas |
| PUs: Prediction Units | SSD: solid-state drive |
| CUs: Coding Units | IC: Integrated Circuit |
| CTU: Coding Tree Unit | JVET: Joint Video Exploration Team |
| CTBs: Coding Tree Blocks | SPS: Sequence Parameter Setting |
| PBs: Prediction Blocks | PPS: Picture Parameter Set |
| SBs: Super Blocks | APS: Adaptation Parameter Set |
| HRD: Hypothetical Reference Decoder | VPS: Video Parameter Set |
| SNR: Signal Noise Ratio | DPS: Decoding Parameter Set |
| CPUs: Central Processing Units | AV1/2: AOMedia Video 1/2 |
| GPUs: Graphics Processing Units | POC: Picture Order Count |
| CRT: Cathode Ray Tube | RPS: Reference Picture Set |
| LCD: Liquid-Crystal Display | DPB: Decoded Picture Buffer |
| OLED: Organic Light-Emitting Diode | DVD: Digital Video Disc |
| CD: Compact Disc | |

What is claimed is:

1. A method for decoding a current prediction block within a current coding block of a video stream, the method comprising:
receiving a flag indicating that the current prediction block is subject to an inter prediction;
deriving a first parameter for quantifying an extent to which the current prediction block shares reference frames with spatially neighboring prediction blocks of the current coding block;
the first parameter, referred to as "nearest_match," comprising a predetermined aggregation of a binary row reference frame matching indicator indicating whether there is a match in reference frame between the current prediction block and at least one spatially neighboring prediction block in a row of prediction blocks immediately above the current coding block and a binary column reference frame matching indicator indicating whether there is a match in reference frame between the current prediction block and at least one spatially neighboring prediction block in a column of prediction blocks immediately left of the current coding block;
deriving a second parameter associated with utilization of motion vector prediction in the spatially neighboring prediction blocks of the current coding block, the second parameter, referred to as "newmv_count," indicating a number of prediction blocks among the spatially neighboring prediction blocks of the current predication block having at least one motion vector that is predicted by at least one reference motion vector; and
selecting coding contexts for at least one of a set of syntaxes associated with the inter prediction of the current prediction block according to the first parameter and the second parameter, wherein selecting the coding context is independent of any temporal motion vector prediction (TMVP) candidate blocks, the set of syntaxes comprising at least dynamic motion vector reference list (DRL) index and single reference inter prediction mode indicator.

2. The method of claim 1, further comprising:
deriving a first context indicator, denoted by "newmv_ctx," from the first parameter and the second parameter as newmv_ctx=nearest_match+(newmv_count>0), the ( ) operator being configured to generate 1 and 0 when a logic expression enclosed therein is true and false, respectively; and
selecting a set of coding contexts for the DRL index of the current prediction block according to the first parameter and the second parameter via at least newmv_ctx.

3. The method of claim 2, wherein the selection of the set of coding contexts for the DRL index the current prediction block according to the first parameter and the second parameter is via at most newmv_ctx.

4. The method of claim 3, further comprising:
deriving a second context indicator, denoted by "refmv_ctx," from the first parameter and the second parameter as refmv_ctx=nearest_match+(newmv_count<A), A being a predefined or signaled positive integer; and
in response to determining that the inter prediction of the current prediction block is in a single reference inter prediction mode, selecting a coding context for the single reference inter prediction mode of the current prediction block according to the first parameter and the second parameter via at most newmv_ctx and refmv_ctx.

5. The method of claim 2, further comprising:
deriving a second context indicator, denoted by "refmv_ctx," from the first parameter and the second parameter as refmv_ctx=nearest_match+Boolean (newmv_count<A), A being a predefined or signaled positive integer; and
in response to determining that the inter prediction of the current prediction block is in a compound reference inter prediction mode, selecting a coding context for the compound reference inter prediction mode of the current prediction block according to the first parameter and the second parameter via at most newmv_ctx and refmv_ctx.

6. The method of claim 2, further comprising, in response to determining that the inter prediction of the current prediction block is in a single reference inter prediction mode, selecting a coding context for the single reference inter prediction mode of the current prediction block according to the first parameter and the second parameter via at most newmv_ctx.

7. The method of claim 2, further comprising, in response to determining that the inter prediction of the current prediction block is in a compound reference inter prediction mode, selecting a coding context for the compound reference inter prediction mode for the current prediction block according to the first parameter and the second parameter via at most newmv_ctx.

8. The method of claim 2, further comprising, in response to determining that an optical flow mode is used for the current prediction block, selecting a coding context for the optical flow mode of the current prediction block according to the first parameter and the second parameter via at most newmv_ctx.

9. The method of claim 1, wherein the derivation of the first parameter and the second parameter involves scanning M number of nearest left column and nearest above row of spatially neighboring prediction blocks of the current coding block in a predefined scanning order, M being a predefined or signaled positive integer.

10. The method of claim 9, wherein the predefined scanning order of the nearest left column and the nearest above row of spatially neighboring prediction blocks follows (L−1, B)→(R, T−1)→(L−1, T)→(L, T−1)→(L−1, B−1)→(L+1, T−1)→(L−1, C_row)→(C_column, T−1), wherein L, R, T, and B, represent left column, right column, top row, bottom row block coordinates of the current coding block, respectively, and C_row and C_column represent current row and current column block coordinate positions of the current prediction block, respectively.

11. The method of claim 9, wherein M=2.

12. The method of claim 9, wherein M=4.

13. The method of claim 12, wherein the predefined scanning order of the nearest left column and the nearest above row of spatially neighboring prediction blocks follows (R, T−1)→(L−1, B)→(L, T−1)→(L−1, T) wherein L, R, T, B represent left column, right column, top row, bottom row block coordinates of the current coding block, respectively.

14. The method of claim 1, further comprising:
deriving a first context indicator, denoted by "newmv_ctx," from the first parameter and the second parameter as newmv_ctx=nearest_match+(newmv_count>0), the ( ) operator being configured to generate 1 and 0 when a logic expression enclosed therein is true and false, respectively; and
deriving a second context indicator, denoted by "refmv_ctx," from the first parameter and the second parameter as refmv_ctx=nearest_match+ (newmv_count<A), A being a predefined or signaled positive integer,
wherein:
selecting the coding contexts for the at least one of the set of syntaxes comprises selecting the contexts according to newmv_ctx and refmv_ctx;
the first parameter and second parameter for deriving newmv_ctx are obtained by scanning at most L number of neighboring prediction blocks in an immediate left column and an immediate above row of the current coding block;
the first parameter and second parameter for deriving refmv_ctx are obtained by scanning at most K number of neighboring prediction blocks in the immediate left column and the immediate above row of the current coding block; and
L and K are predefined or signaled positive integers not greater than M, being a predefined or signaled positive integer.

15. An electronic device for processing a current prediction block within a current coding block of a video stream, the electronic device comprising a memory for storing instructions and a processor for executing the instructions to cause the electronic device to:
receiving a flag indicating that the current prediction block is subject to an inter prediction;
derive a first parameter for quantifying an extent to which the current prediction block shares reference frames with spatially neighboring prediction blocks of the current coding block; the first parameter, referred to as "nearest_match," comprising a predetermined aggregation of a binary row reference frame matching indicator indicating whether there is a match in reference frame between the current prediction block and at least one spatially neighboring prediction block in a row of prediction blocks immediately above the current coding block and a binary column reference frame matching indicator indicating whether there is a match in reference frame between the current prediction block and at least one spatially neighboring prediction block in a column of prediction blocks immediately left of the current coding block;

derive a second parameter associated with utilization of motion vector prediction in the spatially neighboring prediction blocks of the current coding block, the second parameter, referred to as "newmv_count," indicating a number of prediction blocks among the spatially neighboring prediction blocks of the current predication block having at least one motion vector that is predicted by at least one reference motion vector; and selecting coding contexts for at least one of a set of syntaxes associated with the inter prediction of the current prediction block according to the first parameter and the second parameter, wherein selecting the coding context is independent of any temporal motion vector prediction (TMVP) candidate blocks, the set of syntaxes comprising at least dynamic motion vector reference list (DRL) index and single reference inter prediction mode indicator.

16. A method for encoding a video block within a video block group, comprising:

determining that the video block is subject to an inter prediction;

derive a first parameter for quantifying an extent to which the video block shares reference frames with spatially neighboring blocks of the video block group; the first parameter, referred to as "nearest_match," comprising a predetermined aggregation of a binary row reference frame matching indicator indicating whether there is a match in reference frame between the video block and at least one spatially neighboring block in a row of blocks immediately above the video block group and a binary column reference frame matching indicator indicating whether there is a match in reference frame between the video block and at least one spatially neighboring prediction block in a column of blocks immediately left of the video block group;

derive a second parameter associated with utilization of motion vector prediction in the spatially neighboring prediction blocks of the video block, the second parameter, referred to as "newmv_count," indicating a number of blocks among the spatially neighboring blocks of the video block group having at least one motion vector that is predicted by at least one reference motion vector;

selecting coding contexts for at least one of a set of syntaxes associated with the inter prediction of the video block according to the first parameter and the second parameter, wherein selecting the coding context is independent of any temporal motion vector prediction (TMVP) candidate blocks, the set of syntaxes comprising at least dynamic motion vector reference list (DRL) index and single reference inter prediction mode indicator; and encoding the at least one of the set of syntaxes using the selected coding contexts.

17. The method of claim 16, wherein a number of possible contexts is no more than 42.

18. The method of claim 16, wherein a number possible contexts for coding the DRL index is 18 or fewer.

19. The method of claim 1, wherein a number of possible contexts is no more than 42.

20. The method of claim 1, wherein a number possible contexts for coding the DRL index is 18 or fewer.

* * * * *